United States Patent
Siggard et al.

(10) Patent No.: US 12,190,456 B1
(45) Date of Patent: Jan. 7, 2025

(54) PERSONALIZED AUGMENTED REALITY

(71) Applicants: Nathaniel Grant Siggard, Thousand Oaks, CA (US); John C Valentine, Erie, PA (US)

(72) Inventors: Nathaniel Grant Siggard, Thousand Oaks, CA (US); John C Valentine, Erie, PA (US)

(*) Notice: Subject to any disclaimer, the term of this patent is extended or adjusted under 35 U.S.C. 154(b) by 287 days.

(21) Appl. No.: 17/865,287

(22) Filed: Jul. 14, 2022

Related U.S. Application Data

(63) Continuation-in-part of application No. 15/953,433, filed on Apr. 14, 2018, now Pat. No. 11,417,086.

(51) Int. Cl.
| | |
|---|---|
| *G06T 19/00* | (2011.01) |
| *G06Q 30/0207* | (2023.01) |
| *G06Q 50/16* | (2024.01) |
| *G06T 13/80* | (2011.01) |

(52) U.S. Cl.
CPC ....... *G06T 19/006* (2013.01); *G06Q 30/0239* (2013.01); *G06Q 50/16* (2013.01); *G06T 13/80* (2013.01)

(58) Field of Classification Search
CPC ... G06T 19/006; G06T 13/80; G06Q 30/0239; G06Q 50/16
See application file for complete search history.

(56) References Cited

U.S. PATENT DOCUMENTS

| | | | | |
|---|---|---|---|---|
| 2009/0198763 | A1* | 8/2009 | Shin | G06Q 10/00 707/999.102 |
| 2009/0310866 | A1* | 12/2009 | Hamasaki | G06T 11/00 382/284 |
| 2018/0182171 | A1* | 6/2018 | Lipner | G06T 11/00 |

* cited by examiner

*Primary Examiner* — Said Broome
*Assistant Examiner* — Andrew Shin
(74) *Attorney, Agent, or Firm* — Plager Schack LLP; Mark H. Plager, Esq.; Stephen Hallberg, Esq.

(57) ABSTRACT

A system for personalizing augmented reality for individuals that is easy to use and related methods are disclosed.

11 Claims, 32 Drawing Sheets

PERSONALIZED AUGMENTED REALITY

CLAIM OF BENEFIT TO PRIOR APPLICATION

This application is a continuation-in-part of and claims benefit to U.S. Non-Provisional patent application Ser. No. 15/953,433, entitled "Personalized Augmented Reality," filed Apr. 14, 2018. The U.S. Non-Provisional patent application Ser. No. 15/953,433 is incorporated herein by reference.

BACKGROUND

Embodiments of the invention described in this specification relate generally to augmented reality, and more particularly, to a system for personalizing augmented reality for individuals that is easy to use and an audio and visual elements combining method for creating a customized augmented reality experience.

Currently, there are a variety of commercial augmented reality systems available. However, these systems only allow for static images to be used for commercial purposes. The current augmented reality systems only send the user to an advertiser's product or web page or enhance a location showing the individual retail spaces or other commerce. The vast majority of augmented reality is used in gaming for fixed scenarios. Individual customization is not possible for the average person. Personal information that is meaningful cannot easily be created due to the complex coding and other computing hardware and software requirements. In some instances, a person may want to have a permanent memory associated with a specific event or other meaningful situations that can be remembered at a later date, or shared with others using augmented reality.

Therefore, what is needed is a way to personalize augmented reality for individuals that is easy to use.

BRIEF DESCRIPTION

Some embodiments of the invention include (i) a system for personalizing augmented reality for individuals that is easy to use, (ii) methods for personalizing augmented reality for individuals that is easy to use, (iii) novel customized augmented reality audio playback and graphical overlay visual presentation methods, and (iv) a novel customized augmented reality audio playback and graphical overlay visual presentation system are disclosed.

In some embodiments, the system for personalizing augmented reality for individuals that is easy to use comprises a central server and a storage. The central server comprises executable instructions for (i) receiving a personally meaningful multimedia object obtained from either a user selection of an existing multimedia object or creation of a new multimedia object, (ii) generating a sound wave from the personally meaningful multimedia object, (iii) generating an image of the sound wave or an object, (iv) applying the generated image as a tattoo, either permanently or temporarily, to a person, (v) capturing a tattoo image of the applied tattoo, (vi) uploading, via the Internet, data comprising the tattoo image, the generated image, and the personally meaningful multimedia object to the central server, (vii) automatically generating a unique identifier ("UID") based on the uploaded data, (viii) assigning the UID to the uploaded data, and (ix) storing the uploaded data and the UID in the storage.

In some embodiments, the waveform can be selected from the group consisting of multimedia, audio or video recording converted from an analog representation to a digital image. Additionally, the waveform used to create the tattoo that will act as a unique identifier for playback and alignment of the stored augmented reality multimedia associated with the unique identifier. If the user selects a different type of multimedia to be stored and played back, the sound wave from that multimedia can also be used by itself or in conjunction with other indicia of the multimedia object to generate the unique identifier.

In some embodiments, the system also has one or more than one camera enabled smart device (hereinafter also referred to as "mobile device" or "user device") communicatively coupled to the central server. In some embodiments, a user operates a user device to capture an image of the applied tattoo. In some embodiments, the user device comprises a software application with instructions that are executable on a processor of the user device. In some embodiments, the software application is configured to view the captured image of the applied tattoo on the person and determine a unique identifier based on the captured image of the tattoo. Next, the software application retrieves the stored multimedia object from the central server using the determined unique identifier. Upon retrieval to the user device, the software application aligns, orients, and overlays the multimedia object on the captured image of tattoo as applied to the person. Finally, the user initiates playback through the software application, thereby playing the retrieved multimedia from the central serve as an overlay on the user device.

In some embodiments, the methods for personalizing augmented reality for individuals that is easy to use comprises a first method for personalizing augmented reality for individuals that is easy to use that is implemented in software. In some embodiments, the software-implemented first method for personalizing augmented reality for individuals that is easy to use comprises (i) obtaining an image of a tattoo, (ii) uploading, to the central server, a multimedia sound wave form, the image of the tattoo, and an associated multimedia file, (iii) creating an augmented reality ("A/R") overlay either manually, automatically, or both manually and automatically, (iv) automatically creating a UID from the image of the tattoo, or, in the case of a pre-designed tattoo, the UID is created based on an original design, (v) storing the UID and all the associated data in the storage for later retrieval by a user, and (vi) playing the associated data retrieved from the storage using the UID as a timed overlay coincident with the playback of the associated data, where, preferably, the overly is a video overlay that is matched and aligned to the tattoo.

In some embodiments, the methods for personalizing augmented reality for individuals that is easy to use comprises a second method for personalizing augmented reality for individuals that is easy to use. In some embodiments, the second method for personalizing augmented reality for individuals that is easy to use is a processor executable method implemented in software. In some embodiments, the process executable software-implemented second method for personalizing augmented reality for individuals that is easy to use comprises (i) receiving a user selection of a multimedia file to convert, (ii) converting the multimedia file into a two dimensional sound waveform, (iii) capturing an image of a completed tattoo, (iv) uploading, to a central server, the multimedia file, the converted sound waveform, and the image of the completed tattoo, (v) creating a UID for the multimedia file, the converted sound waveform, and the image of the completed tattoo (collectively referred to as the "associated data"), (vi) creating an animated A/R overlay, (vii) storing the animated A/R overlay with the associated data in a storage that is communicably connected to the central server, (viii) utilizing an A/R application to capture, via a camera-enabled smart device, a live image or scan of the tattoo as applied to the skin of a user, (ix) using the captured image or scan by an image recognition process of the A/R application to determine the UID of the associated data and, upon determining the UID, to locate the associated data in the storage of the central server, (x) automatically identifying the image of the completed tattoo by using image recognition of the captured image or scan, (xi) transmitting the associated data to the camera-enabled smart device, and (xii) presenting the A/R overlay, by the camera-enabled smart device, wherein presenting the A/R overlay comprises overlaying, aligning, and displaying the A/R overlay in relation to the live image or scan of the tattoo as applied to the skin of the user with options to present the associated data.

In some embodiments, the customized augmented reality audio playback and graphical overlay visual presentation methods comprise customized augmented reality audio playback and graphical overlay visual presentation non-soundwave tattoo methods. In some embodiments, the customized augmented reality audio playback and graphical overlay visual presentation non-soundwave tattoo methods comprise (i) a client-side customized augmented reality audio playback and graphical overlay visual presentation non-soundwave tattoo method and (ii) a server-side customized augmented reality audio playback and graphical overlay visual presentation non-soundwave tattoo method.

In some embodiments, the client-side customized augmented reality audio playback and graphical overlay visual presentation non-soundwave tattoo method comprises (i) capturing a photo of a tattoo by a camera-enabled user device operated by a user, (ii) receiving, by user interaction with a software application running on the camera-enabled user device, a user selection of a multimedia file with an audio portion, (iii) uploading, through the software application running on the camera-enabled user device, full resolution image data for the photo of the tattoo and the multimedia file with the audio portion to a cloud application service that is configured to create an augmented reality overlay, (iv) activating an augmented reality experience for a soundwave script tattoo or a soundwave symbol tattoo, (v) capturing a second photo of the tattoo by the camera-enabled user device while running the software application, (vi) generating a reduced resolution second photo of the tattoo with reduced second image data by performing a resolution down-sampling method to reduce resolution of the second photo of the tattoo to a lower resolution than the full resolution of the second photo of the tattoo, (vii) uploading, by the software application running on the camera-enabled user device, the second reduced image data of the reduced resolution second photo of the tattoo resulting from performance of the resolution down-sampling method against the second photo of the tattoo, (viii) receiving, by the software application running on the camera-enabled user device and from the cloud application service hosted by the system, an augmented reality overlay animation to playback on a screen of the camera-enabled user device, (ix) aligning position and orientation of the augmented reality overlay on the screen of the camera-enabled user device to a live image of the tattoo shown on the screen, and (x) playing, in the software application running on the camera-enabled user device, the aligned augmented reality overlay while audibly outputting the audio portion of the multimedia file.

In some embodiments, the server-side customized augmented reality audio playback and graphical overlay visual presentation non-soundwave tattoo method comprises (i) receiving, by a cloud application service, a multimedia file with an audio portion and an image of a tattoo from a user device operated by a user, (ii) automatically performing, by the cloud application service, a resolution down-sampling method against a full resolution of the image of the tattoo, (iii) calculating, by the cloud application service, a unique tattoo image hash value by applying a hash function to the reduced image data of the reduced resolution image, (iv) creating, by the cloud application service, an augmented reality overlay animation based on the image of the tattoo at the full resolution, (v) associating the augmented reality overlay animation with the unique tattoo image hash value, (vi) storing, in a storage, the multimedia file with the audio portion, the image of the tattoo at the full resolution, the reduced image data of the reduced resolution image, the unique tattoo image hash value, and the augmented reality overlay animation associated with the unique tattoo image hash value, (vii) approving an activation of an augmented reality experience for a soundwave script tattoo or a soundwave symbol tattoo, (viii) receiving, by the cloud application service, a reduced resolution second image of a tattoo comprising second reduced image data of the tattoo in a request for an augmented reality overlay animation by a user device, (ix) calculating, by the cloud application service, a second unique tattoo image hash value by applying the hash function to the second reduced image data of the reduced resolution second image of the tattoo, (x) searching the storage for a hash value that matches the second unique tattoo image hash value, (xi) retrieving, from the storage, the augmented reality overlay animation associated with the unique tattoo image hash value, (xii) transmitting, to the user device, the augmented reality overlay animation associated with the unique tattoo image hash value to playback on a screen of the user device, and (xiii) playing the augmented reality overlay animation associated with the unique tattoo image hash value as a timed overlay coincident with playback of the audio portion of the multimedia file and aligned with the tattoo as presented in a camera field of view on the screen.

In some embodiments, the customized augmented reality audio playback and graphical overlay visual presentation methods comprise non-tattoo soundwave design methods for creating and playing customized augmented reality and graphical overlay audio-visual presentations for non-tattoo soundwave design objects. In some embodiments, the non-tattoo soundwave design methods comprise (i) a two-dimensional non-tattoo soundwave design method for creating and playing a customized augmented reality and graphical overlay audio-visual presentation for a two-dimensional non-tattoo soundwave design object and (ii) a three-dimensional non-tattoo soundwave design method for creating and playing a customized augmented reality and graphical overlay audio-visual presentation for a three-dimensional non-tattoo soundwave design object.

In some embodiments, the two-dimensional non-tattoo soundwave design method for creating and playing a customized augmented reality and graphical overlay audio-visual presentation for a two-dimensional non-tattoo soundwave object comprises (i) capturing an image of a non-tattoo two-dimensional ("2D") soundwave design, (ii) receiving a selection of a multimedia file with an audio portion to associate with the 2D soundwave design, (iii) uploading the captured image with full resolution image data (the image data of the captured image being in a resolution as captured, or "full resolution") and the selected multimedia file with the audio portion to a cloud application service, (iv) activating an augmented reality experience for a non-tattoo 2D soundwave object, (v) capturing a subsequent image of a publicly accessible deployment of the non-tattoo 2D soundwave object, (vi) uploading, to the cloud application service, reduced resolution image data for a reduced image resulting from a reduction in resolution of the subsequent image, (vii) receiving, from the cloud application service, an augmented reality overlay animation with the audio portion for playback in view of the non-tattoo 2D soundwave design, (viii) aligning position and orientation of the augmented reality overlay animation with respect to the non-tattoo 2D soundwave design, and (ix) playing the audio and the aligned augmented reality overlay animation at any publicly accessible deployment location of the non-tattoo 2D soundwave design.

In some embodiments, the three-dimensional non-tattoo soundwave design method for creating and playing a customized augmented reality and graphical overlay audiovisual presentation for a three-dimensional non-tattoo soundwave object comprises (i) capturing an image of a non-tattoo three-dimensional ("3D") soundwave design, (ii) receiving a selection of a multimedia file with an audio portion to associate with the non-tattoo 3D soundwave design, (iii) generating a digital 3D model based on a perspective view of the non-tattoo 3D soundwave design in the captured image, (iv) uploading the captured image with full resolution image data (the image data of the captured image being in a resolution as captured, or "full resolution"), the digital 3D model, and the selected multimedia file with the audio portion to a cloud application service, (v) activating an augmented reality experience for a non-tattoo 3D soundwave object, (vi) capturing a subsequent image of a soundwave object resembling the non-tattoo 3D soundwave design, (vii) determining whether the subsequent image includes a perspective view of the soundwave object resembling the non-tattoo 3D soundwave design and, when not including a perspective view, ending or recapturing the subsequent image of the soundwave object resembling the non-tattoo 3D soundwave design, and when including a perspective view, continuing to the next step, (viii) generating a digital 3D model based on the perspective view of the soundwave object resembling the non-tattoo 3D soundwave design in the subsequent image, (ix) uploading a reduced resolution version of the captured image and the digital 3D model to the cloud application service, (x) receiving, from the cloud application service, an augmented reality overlay animation and audio to playback in view of the non-tattoo 3D soundwave design, and (xi) playing the augmented reality overlay animation and audio in view of the non-tattoo 3D soundwave design. In some embodiments, the step for receiving an augmented reality overlay animation and audio from the cloud application service occurs when (a) the 3D model of the resembling soundwave design and the 3D model of the original soundwave design are normalized to a common size and oriented to a same perspective in 3D space and (b) determined to be the same non-tattoo 3D soundwave design object.

In some embodiments, the customized augmented reality audio playback and graphical overlay visual presentation system hosts a cloud application service that is configured to generate and store an image of an object, compare a real-world object to the stored image of the object, and, upon matching the real-world object to the stored image of the object, create a customized augmented reality experience that outputs audio associated with the stored image of the object and displays a visual graphical overlay aligned to a view of the real-world object.

In some embodiments, the customized augmented reality audio playback and graphical overlay visual presentation system performs a resolution down-sampling method to reduce resolution of the images being transmitted over the Internet. The result of reducing resolution is an image of a tattoo or other target soundwave form or other non-soundwave form or shape to a lower resolution of the same than the full resolution of the original image as captured by the camera. Furthermore, the lower resolution image is used to create a hash value that provides a unique identification ("UID") of the original image file, along with all other associated files and data (e.g., multimedia file with audio portion, low resolution image, digital 3D models, etc.) corresponding to the augmented reality experience when created. By using lower resolution images to generate hash values as UIDs, the speed of comparing images and searching for matches much faster than otherwise would be the case.

In some embodiments, the customized augmented reality audio playback and graphical overlay visual presentation system comprises a target identifier hash database. In some embodiments, the customized augmented reality audio playback and graphical overlay visual presentation system comprises a target identifier hash lookup table (LUT).

In some embodiments, the customized augmented reality audio playback and graphical overlay visual presentation system scales the speed of comparing camera (image and photo) input to target data by a resolution down-sampling method that down-samples resolution of individual images or video feed image frames for transmission to the central server to search for the target data. In particular, an augmented reality algorithm deployed by the customized augmented reality audio playback and graphical overlay visual presentation system compares a hash of down-sampled camera input to target identifier (or unique identifier) hashes by lookup in a target identifier hash database or a target identifier hash LUT. By performing the resolution down-sampling method that down-samples resolution of individual images or video feed image frames for transmission to the central server to search for the target data, the customized augmented reality audio playback and graphical overlay visual presentation system can compare the camera input in realtime, even when working with high definition camera source.

Specifically, the customized augmented reality audio playback and graphical overlay visual presentation system of some embodiments reduces the resolution of the camera input which significantly speeds up the process of generating a unique identifier hash from each camera video frame in order to compare those hashes against the hash values stored in the target identifier hash database or the target identifier hash LUT. Contemporaneously, the high definition camera feed is visually output on the user device within the software application for the user to view in realtime. Accordingly, the customized augmented reality audio playback and graphical overlay visual presentation system carries out all processing steps of the resolution down-sampling method as a background process so the user never sees any degradation of the quality of the video feed presented on the screen of their user device. Also, once the target hash is identified, the customized augmented reality audio playback and graphical overlay visual presentation system continues to use the low resolution camera feed to track the image target in order to align the playback overlay to the camera input using an X, Y grid. In some embodiments, this is done where the target image used to train the unique identifier hash database is the same proportions as the overlay mask image. By using the low resolution camera feed for this image tracking function, the overlay alignment moves more fluidly in realtime in relation to the camera input which is constantly moving due to the user holding the camera of the user device.

In some embodiments, the customized augmented reality audio playback and graphical overlay visual presentation system comprises a tattoo image database storing a multitude of tattoo images as well as the corresponding image mask overlays of the tattoos in the tattoo images (also referred to as a "library of tattoo photos and image mask overlays"). In some embodiments, the customized augmented reality audio playback and graphical overlay visual presentation system uses the library of tattoo photos and image mask overlays stored in the tattoo image database to train machine learning models to identify tattoos in photos. In some embodiments, the customized augmented reality audio playback and graphical overlay visual presentation system is configured to use the library of tattoo photos and image mask overlays as a training set to train a machine learning algorithm to recognize tattoos in photos or video and automatically generate real-time overlay masks corresponding to the tattoos. This is an improvement over manual observation-style systems, or even automated systems, since there is no truly simple way to identify a tattoo in a photo and match the photographic tattoo to an image mask of the tattoo because of the wide variations that exist between skin types, colors, hair, and the variations in lighting conditions which the photos or video are taken.

In some embodiments, the customized augmented reality audio playback and graphical overlay visual presentation system comprises an augmented reality target database that is configured to enable augmented reality overlay experience playback when a viewing user is located nearby a target source (hereinafter referred to as the "augmented reality target"). In some embodiments, the customized augmented reality audio playback and graphical overlay visual presentation system stores each augmented reality target in the augmented reality target database and associates the augmented reality target with an account of a registered user so that the augmented reality experience can only be identified and played back by the user that created it (the "creator user"). In some embodiments, the creator user can enable location services within their user device and then turn on a setting in the software application to allow for sharing of augmented reality targets with other users who are present within a nearby area of the creator user as defined by a specified radius. The other nearby users within this radius can then add the augmented reality experience of the creator user to a local database on their respective devices and associated with the software application in order to identify the augmented reality target of the user creator for playback.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
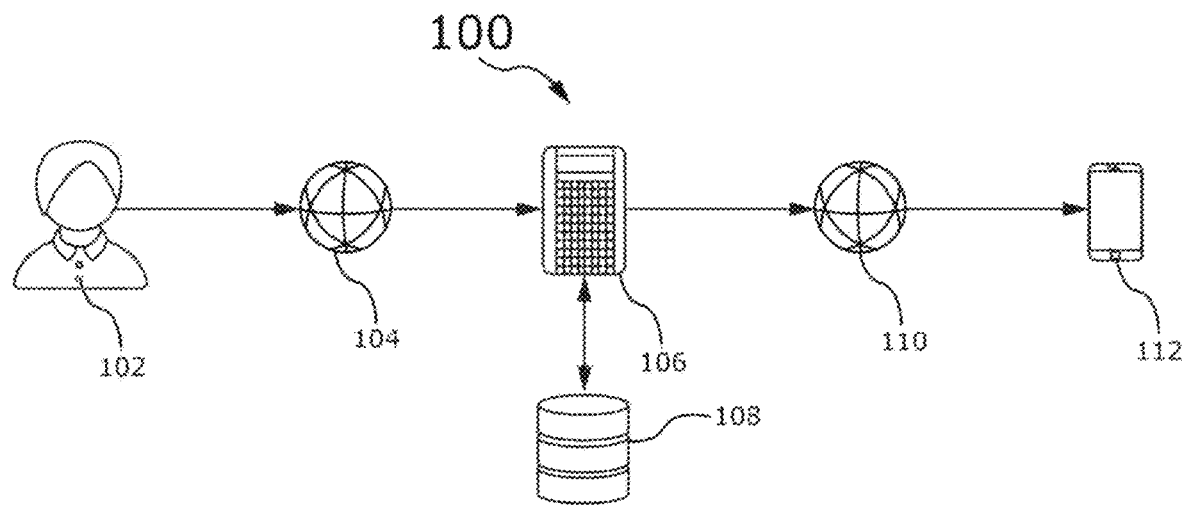

Having thus described the invention in general terms, reference is now made to the accompanying drawings, which are not necessarily drawn to scale, and which show different views of different example embodiments, and wherein:

FIG. 1 is a diagram of a system for personalizing augmented reality for individuals that is easy to use, according to one embodiment of the invention.

Figure 2:
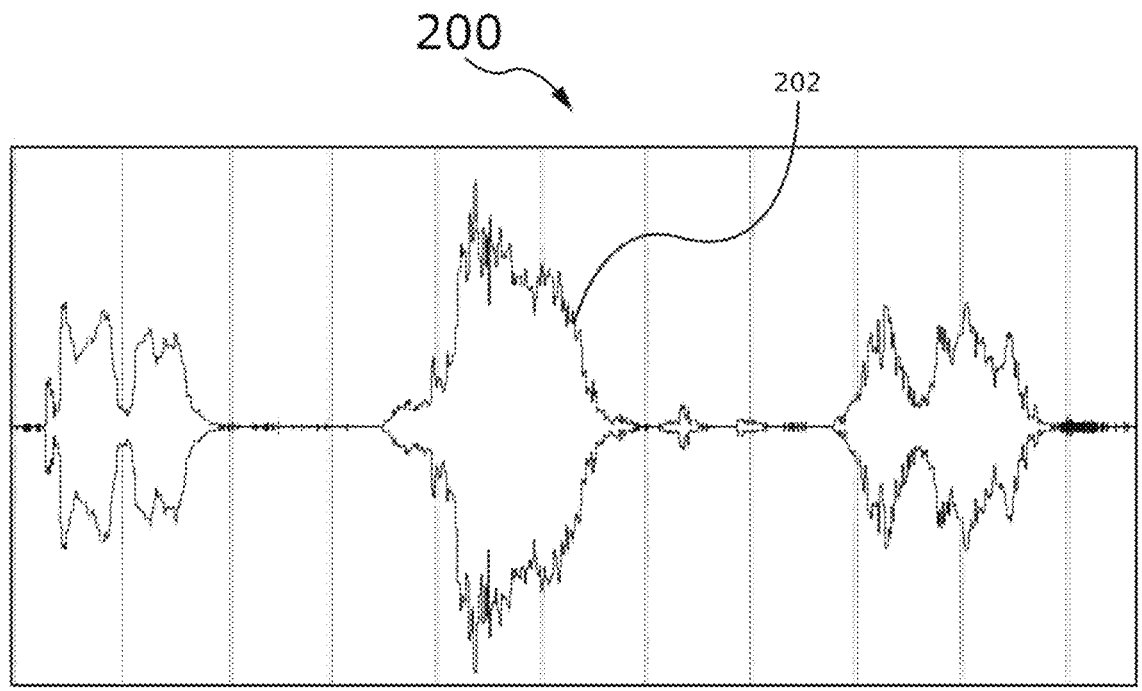

FIG. 2 is a diagram of a multimedia sound wave useful for the system of FIG. 1.

Figure 3:
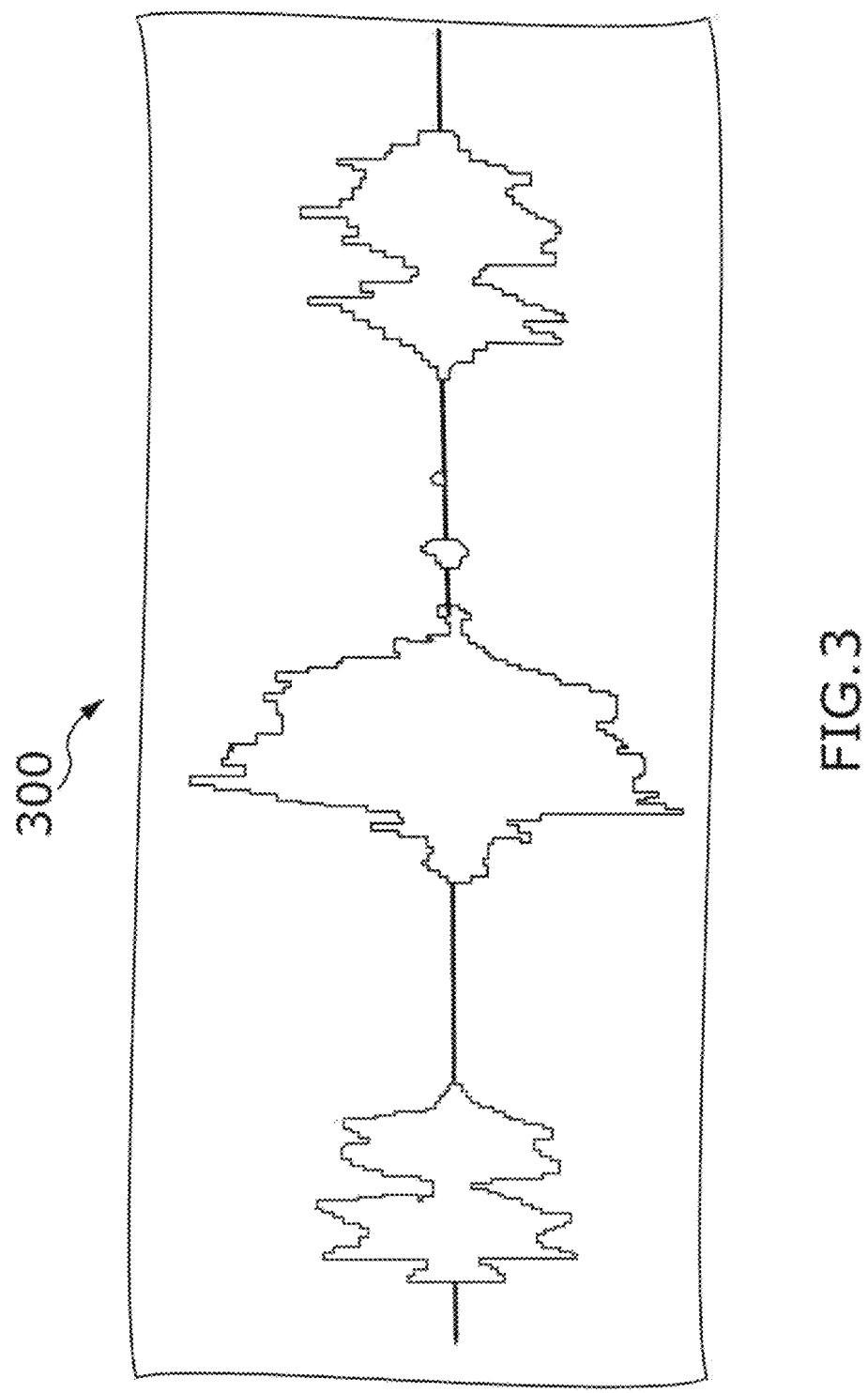

FIG. 3 is a tattoo of the multimedia sound wave of FIG. 2.

Figure 4:
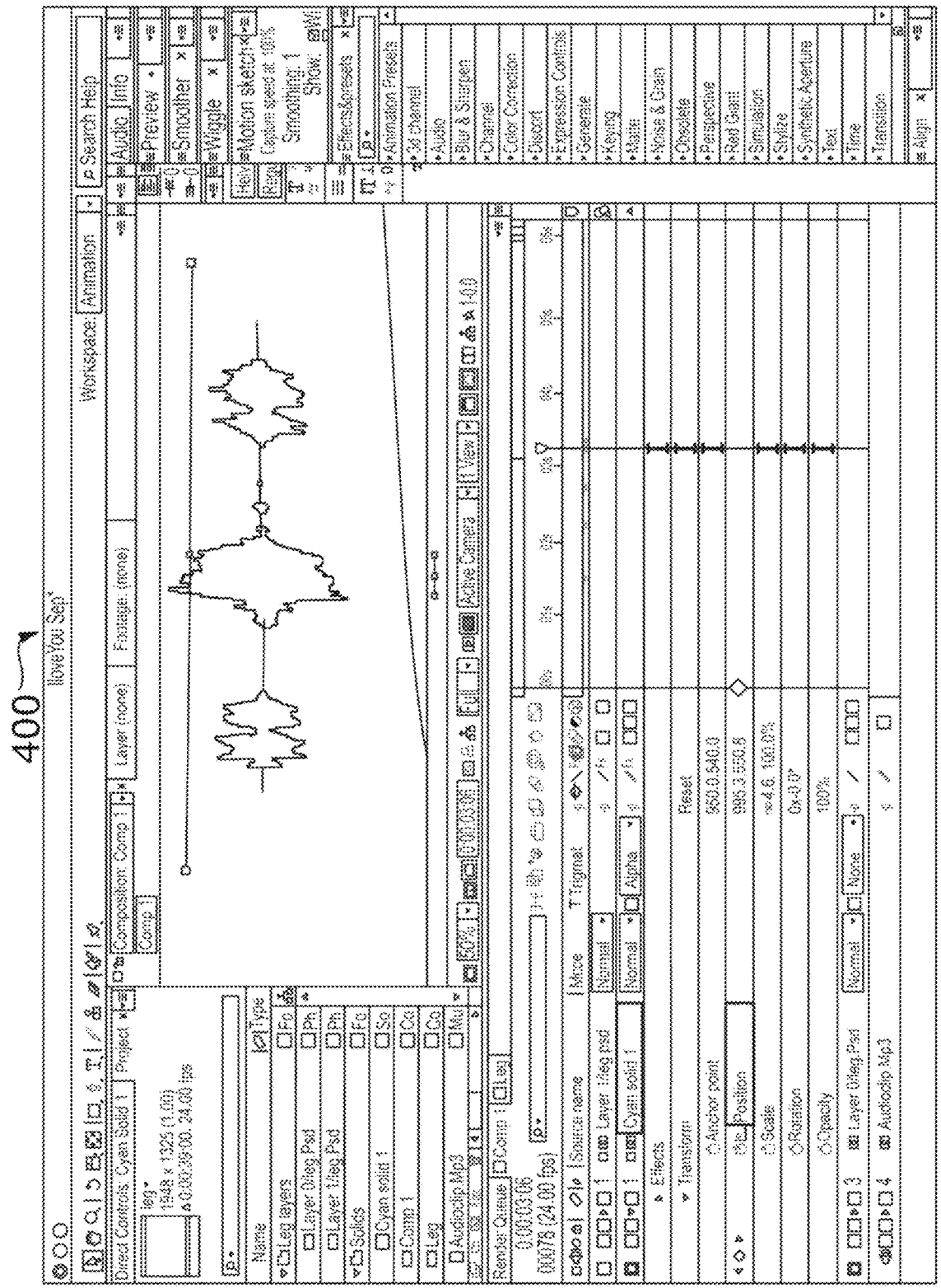

FIG. 4 is a diagram of a computer implemented method for creating an augmented reality overlay and unique identifier from a photo of the tattoo of FIG. 3.

Figure 5:
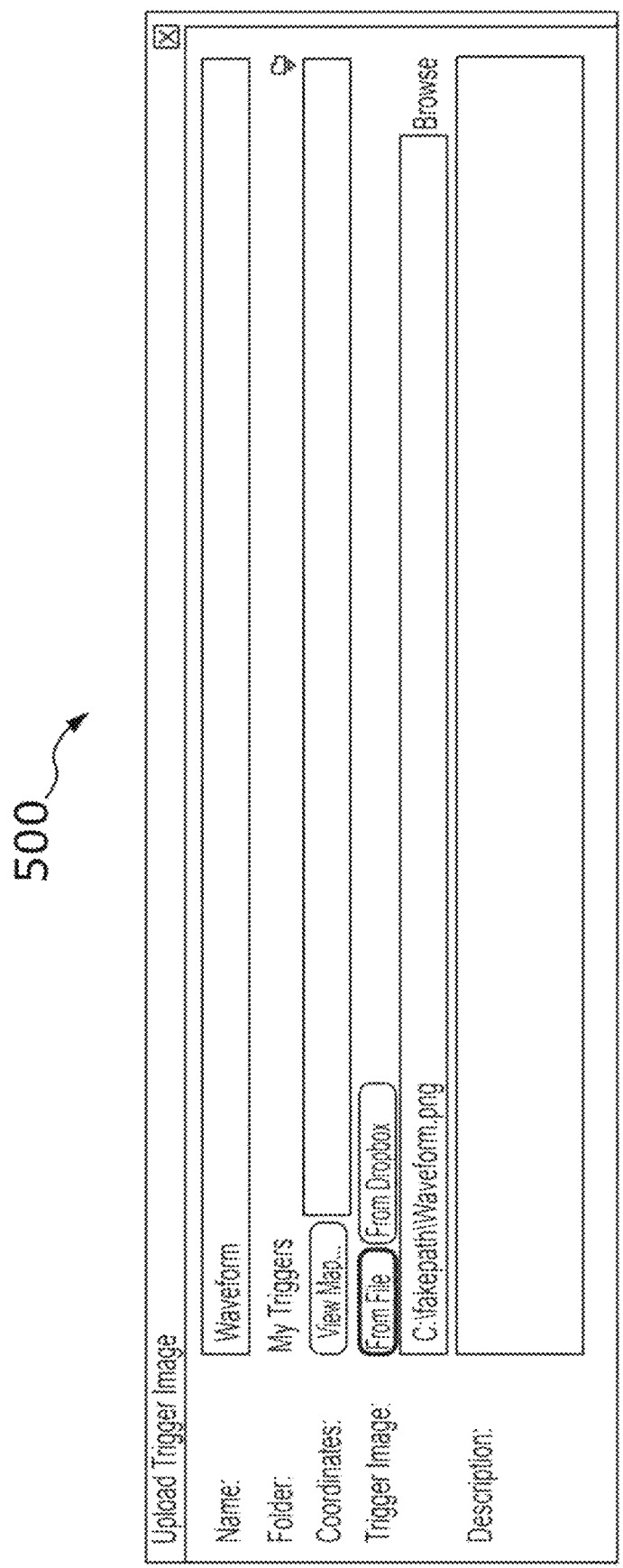

FIG. 5 is a screenshot diagram of uploading the completed tattoo created from user generated multimedia that becomes a unique identifier created from the completed tattoo.

Figure 6:
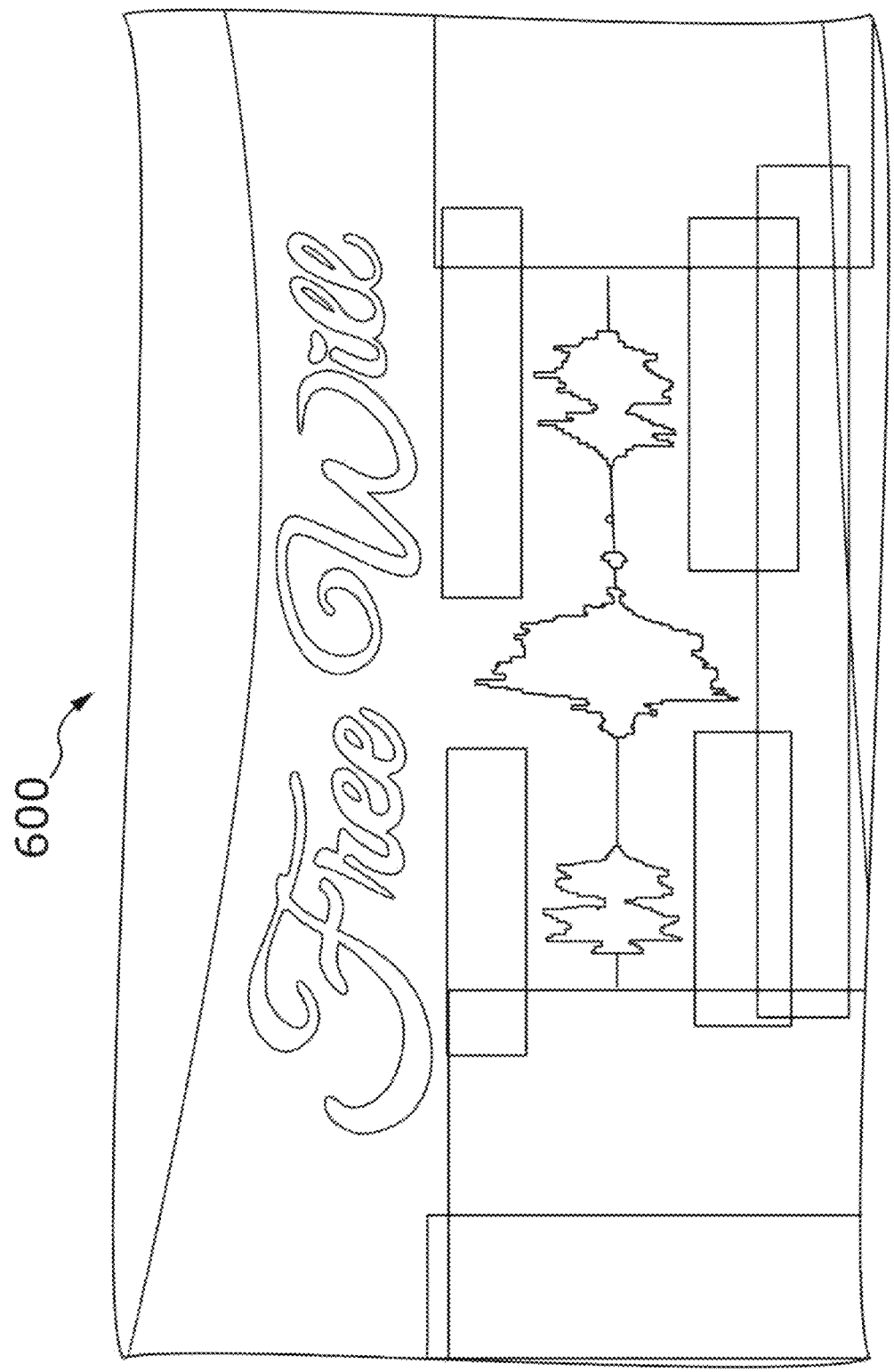

FIG. 6 is a screenshot diagram showing the system masking the tattoo to create a unique identifier target image and to prepare it for image recognition.

Figure 7:
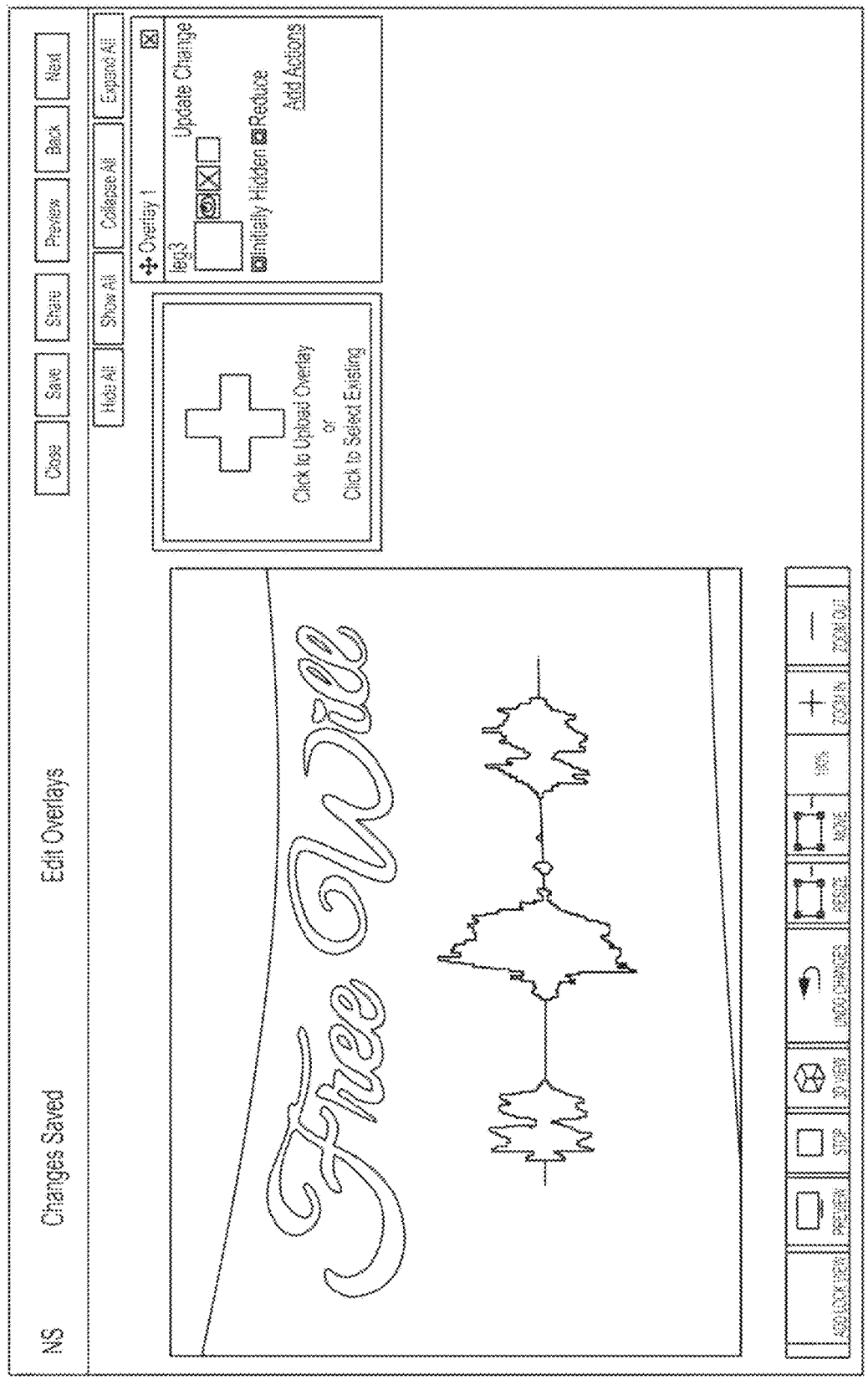

FIG. 7 is a diagram of an application that assigns a unique identifier to the image of the tattoo for playback and alignment of a stored multimedia.

Figure 8:
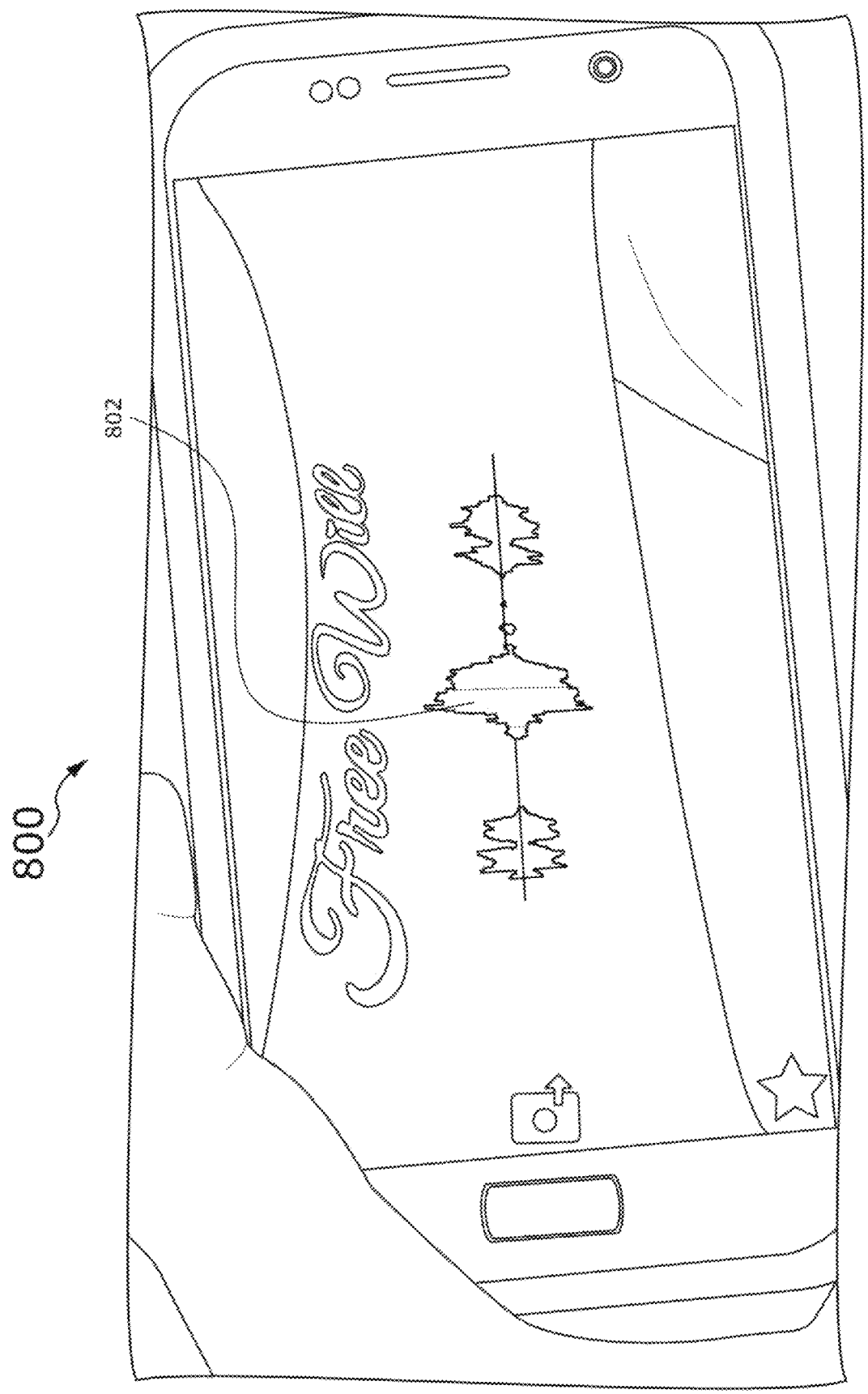

FIG. 8 is a screenshot of an application for playback and alignment of a stored multimedia file identified using the unique identifier.

Figure 9:
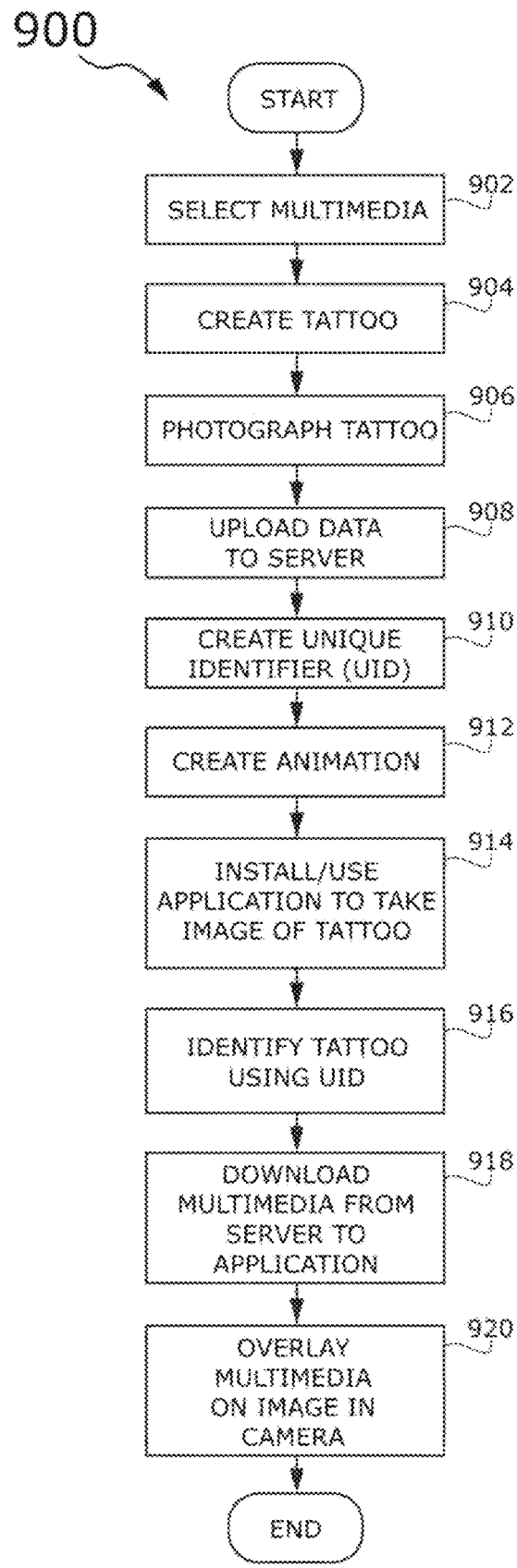

FIG. 9 is a flowchart diagram of some steps of a method for implementing the system of FIG. 1.

Figure 10:
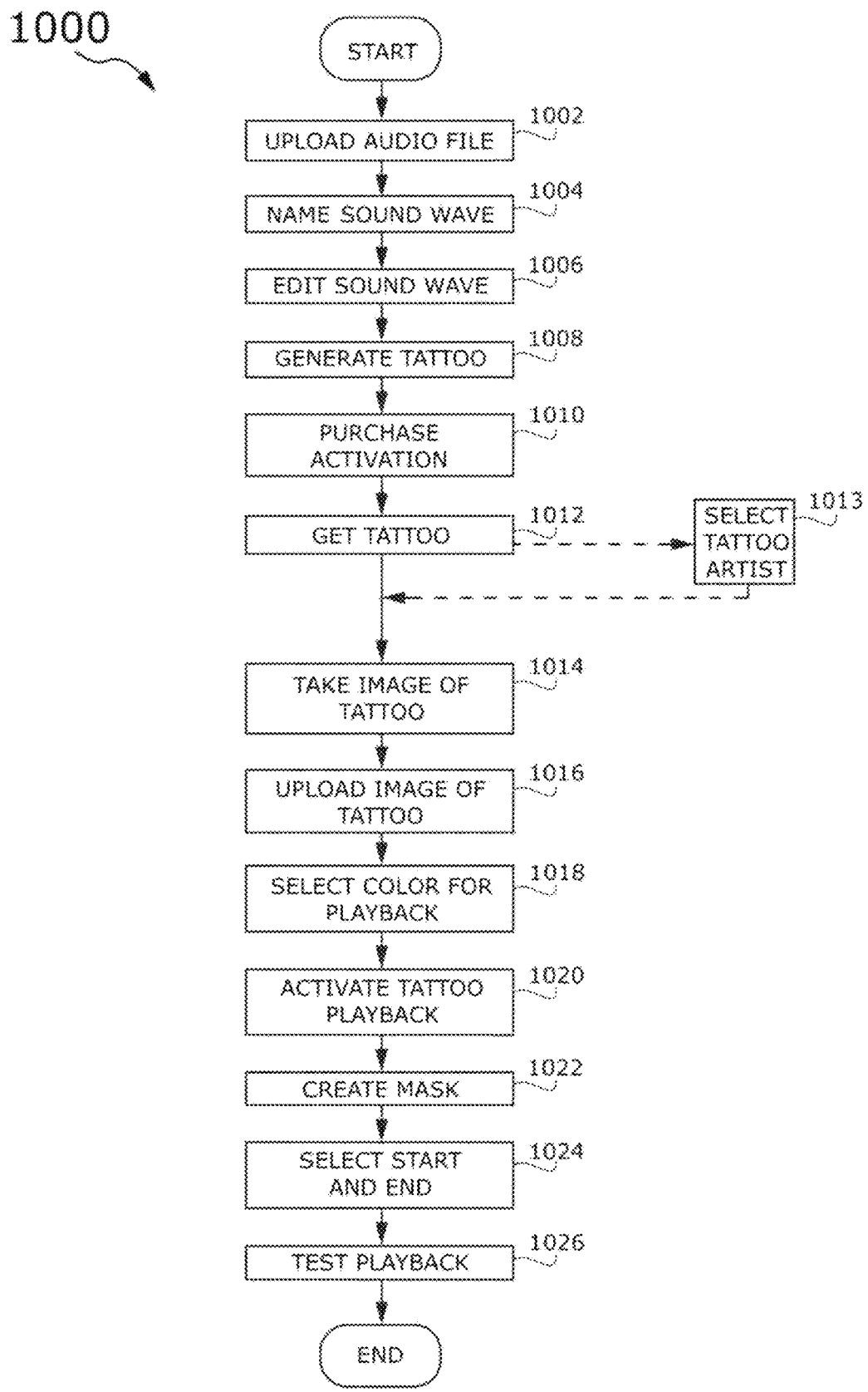

FIG. 10 is a flowchart diagram of some steps of another method for implementing the system of FIG. 1.

Figure 11:
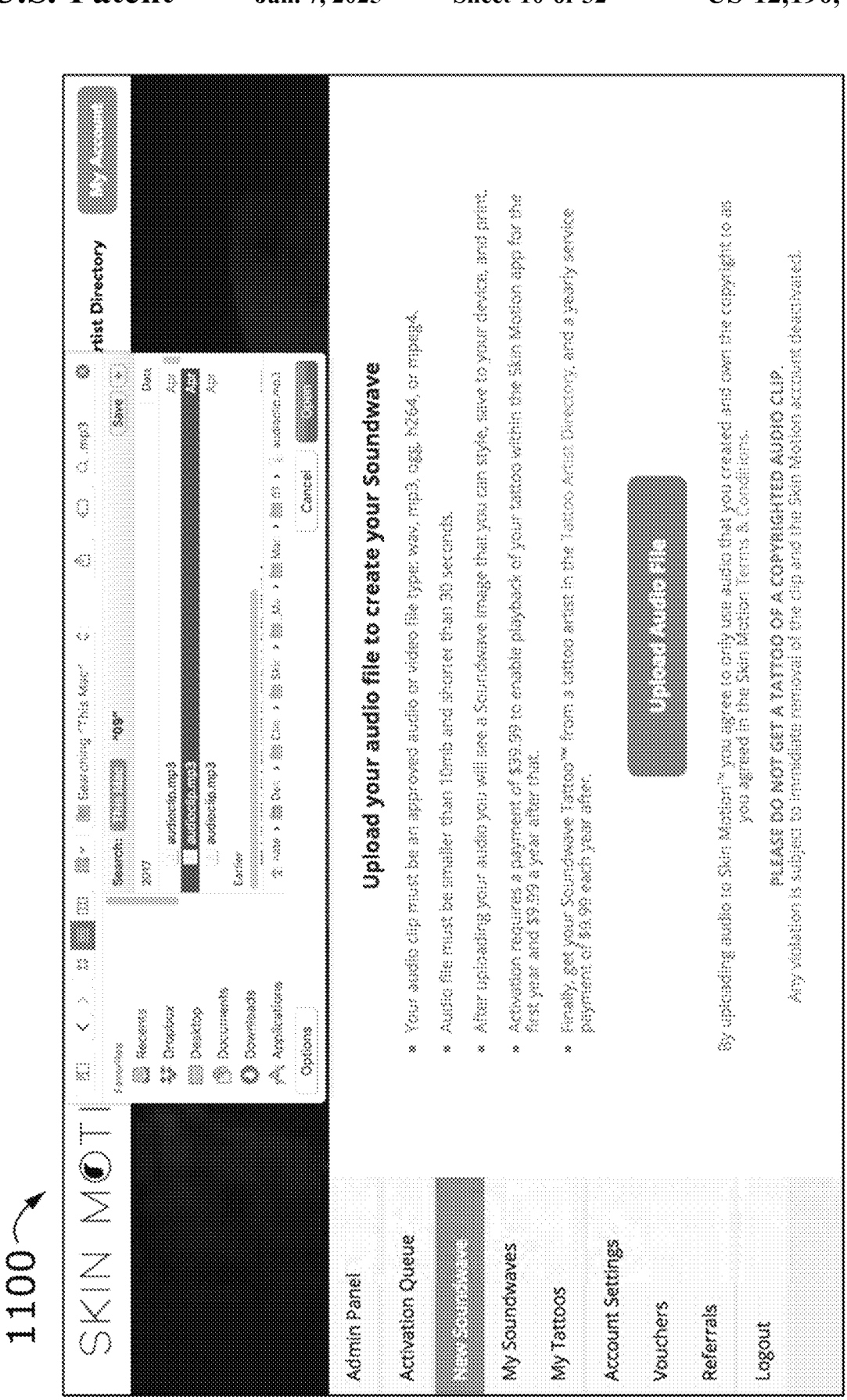

FIG. 11 is a screenshot of the first step in the method shown in the flowchart of FIG. 10.

Figure 12:
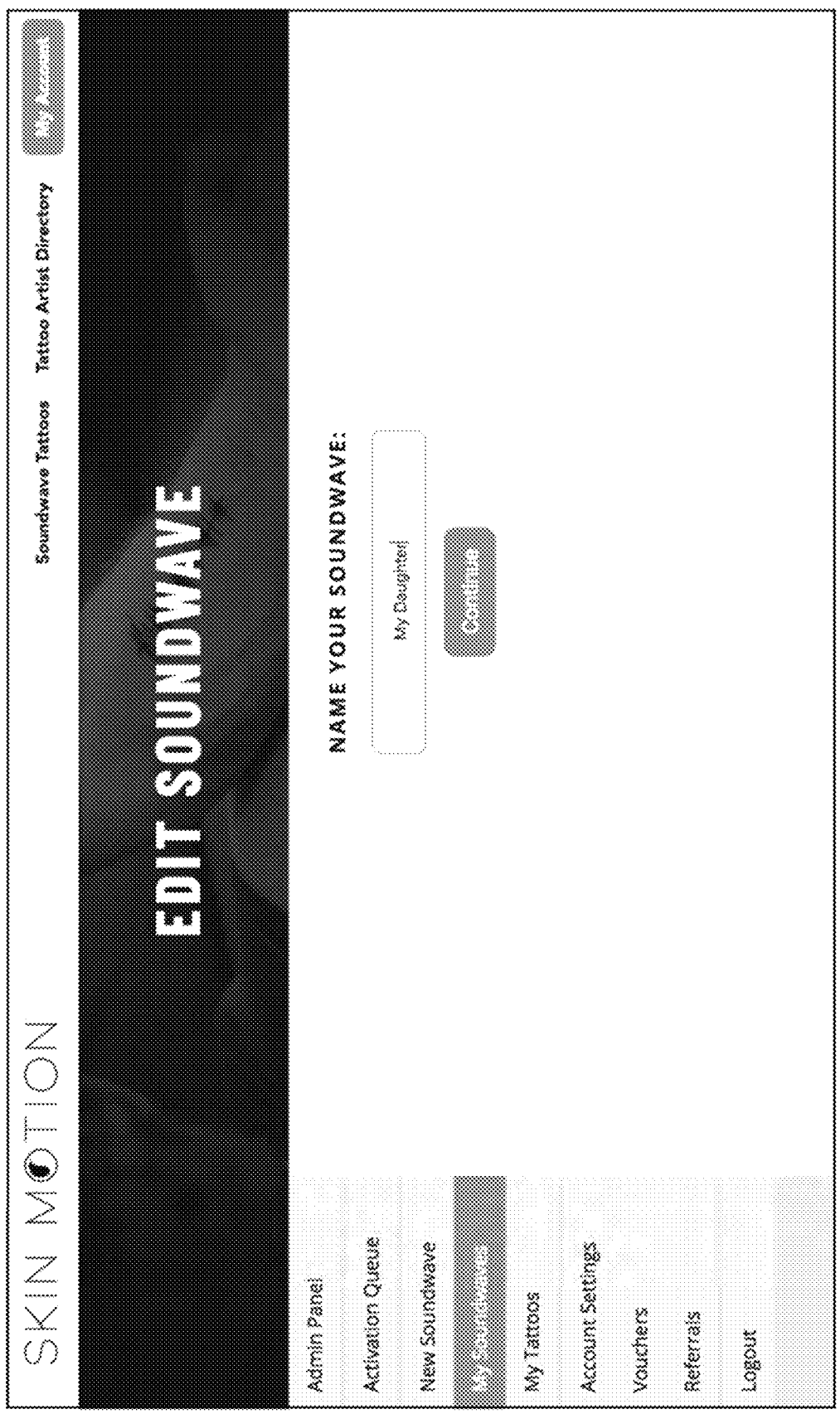

FIG. 12 is a screenshot of the second step in the method shown in the flowchart of FIG. 10.

Figure 13:
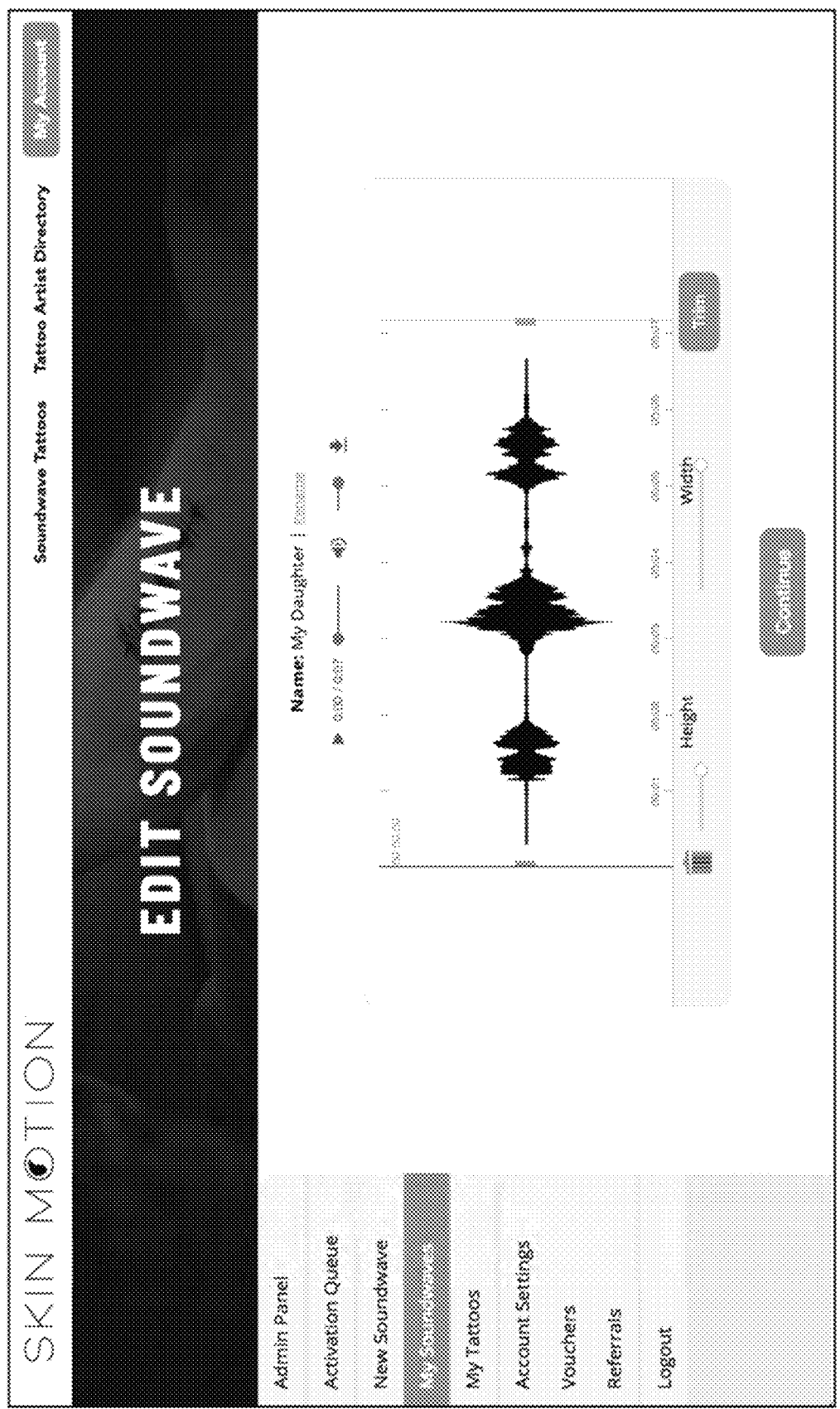

FIG. 13 is a screenshot of the third step in the method shown in the flowchart of FIG. 10.

Figure 14:

FIG. 14 is a screenshot of the fourth step in the method shown in the flowchart of FIG. 10.

Figure 15:
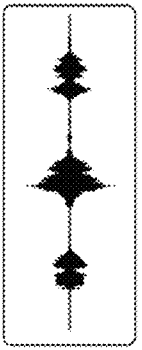

FIG. 15 is a screenshot of the fifth step in the method shown in the flowchart of FIG. 10.

Figure 16:
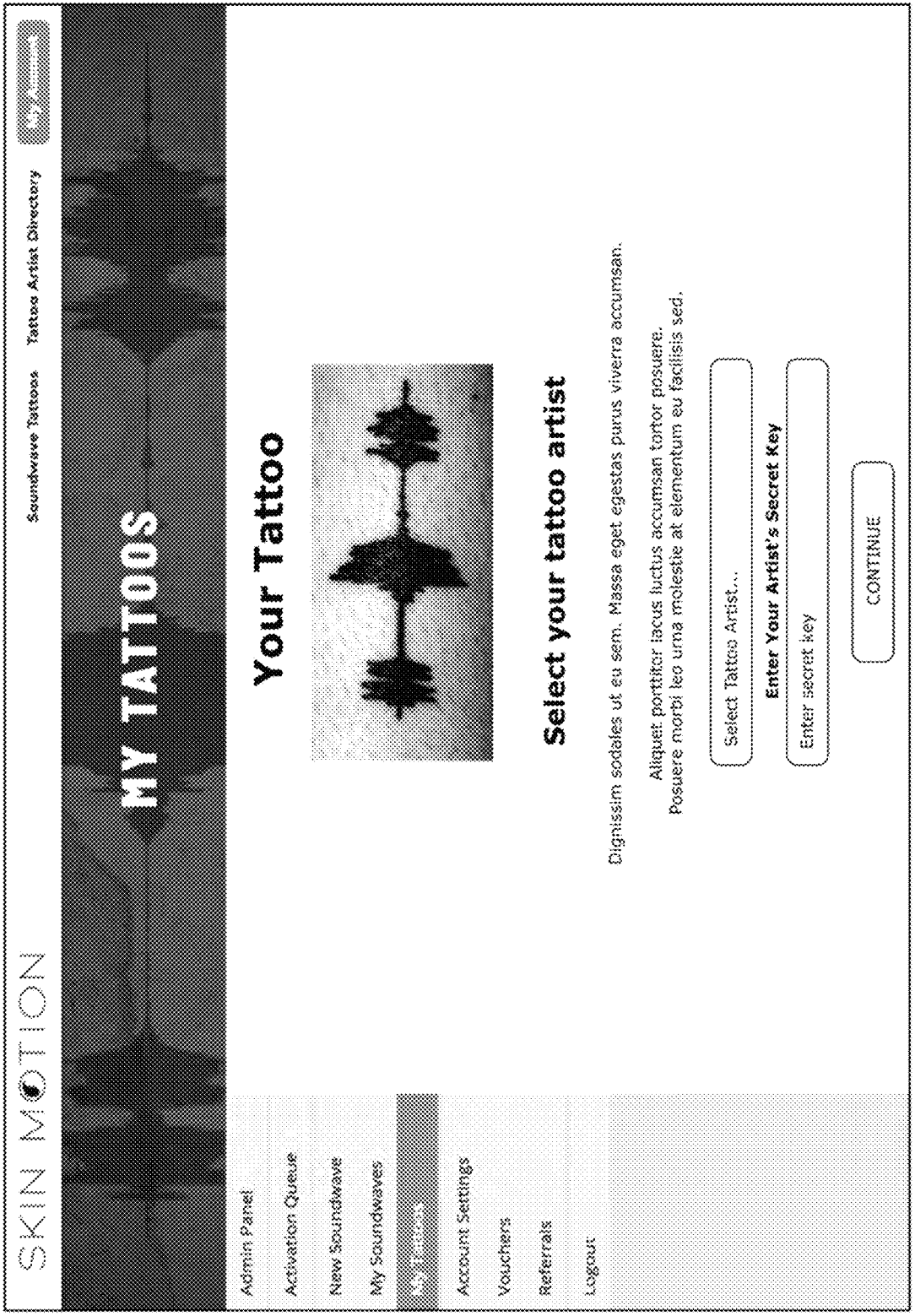

FIG. 16 is a screenshot of the sixth step in the method shown in the flowchart of FIG. 10.

Figure 17:
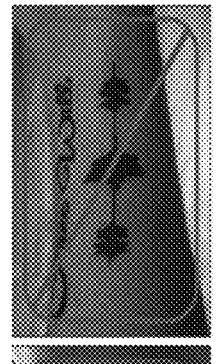

FIG. 17 is a screenshot of the seventh step in the method shown in the flowchart of FIG. 10.

Figure 18:
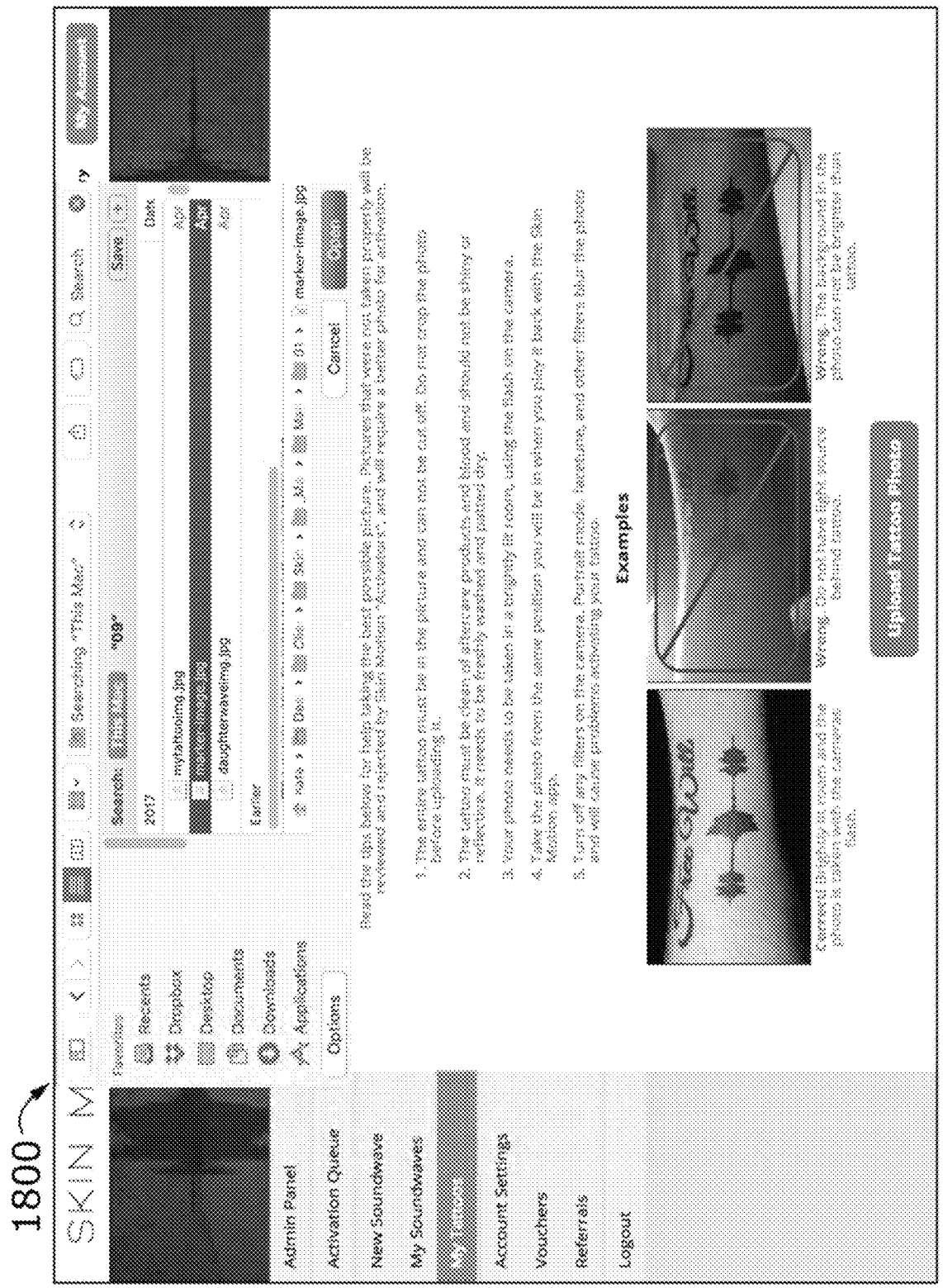

FIG. 18 is a screenshot of the eighth step in the method shown in the flowchart of FIG. 10.

Figure 19:
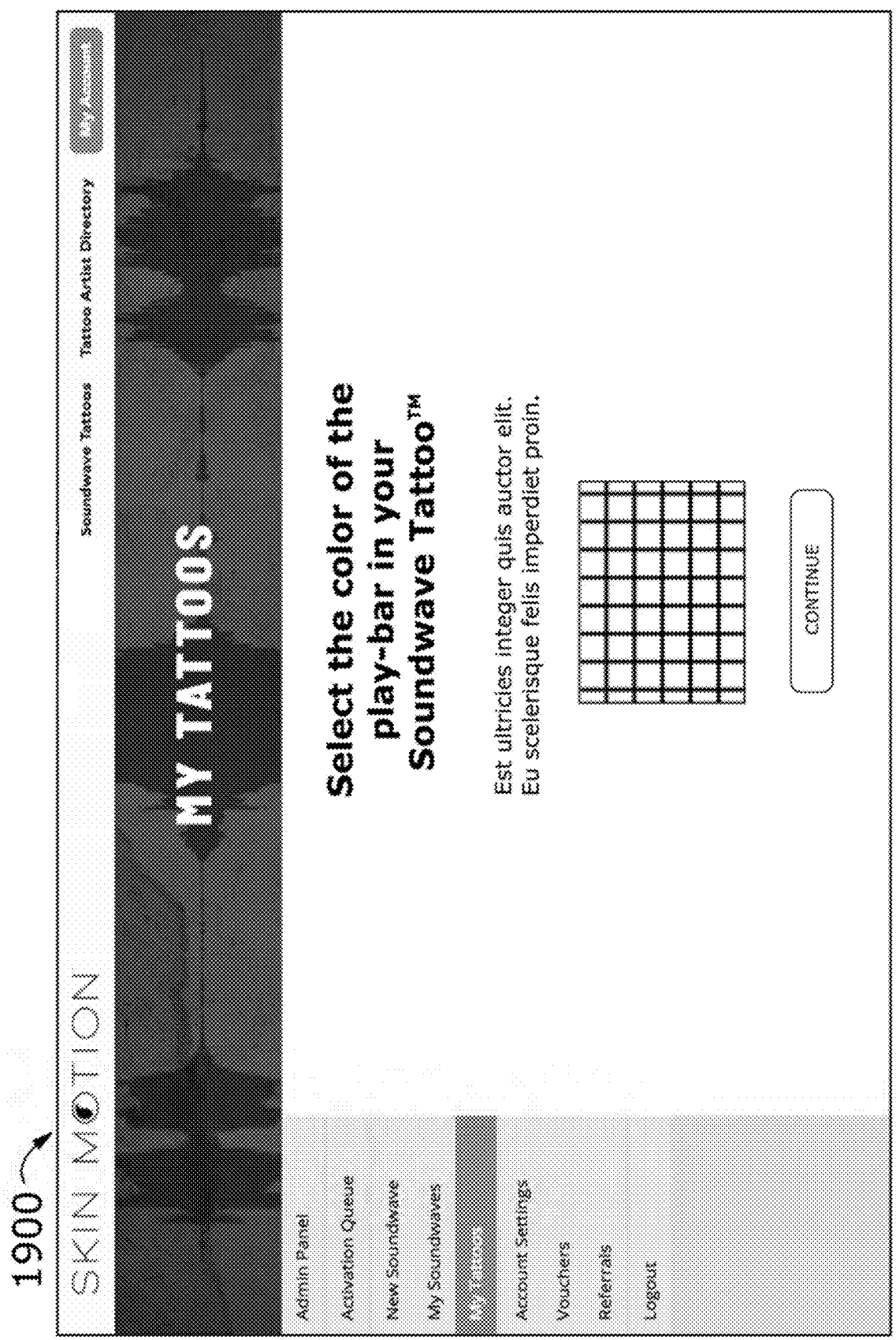

FIG. 19 is a screenshot of the ninth step in the method shown in the flowchart of FIG. 10.

Figure 20:
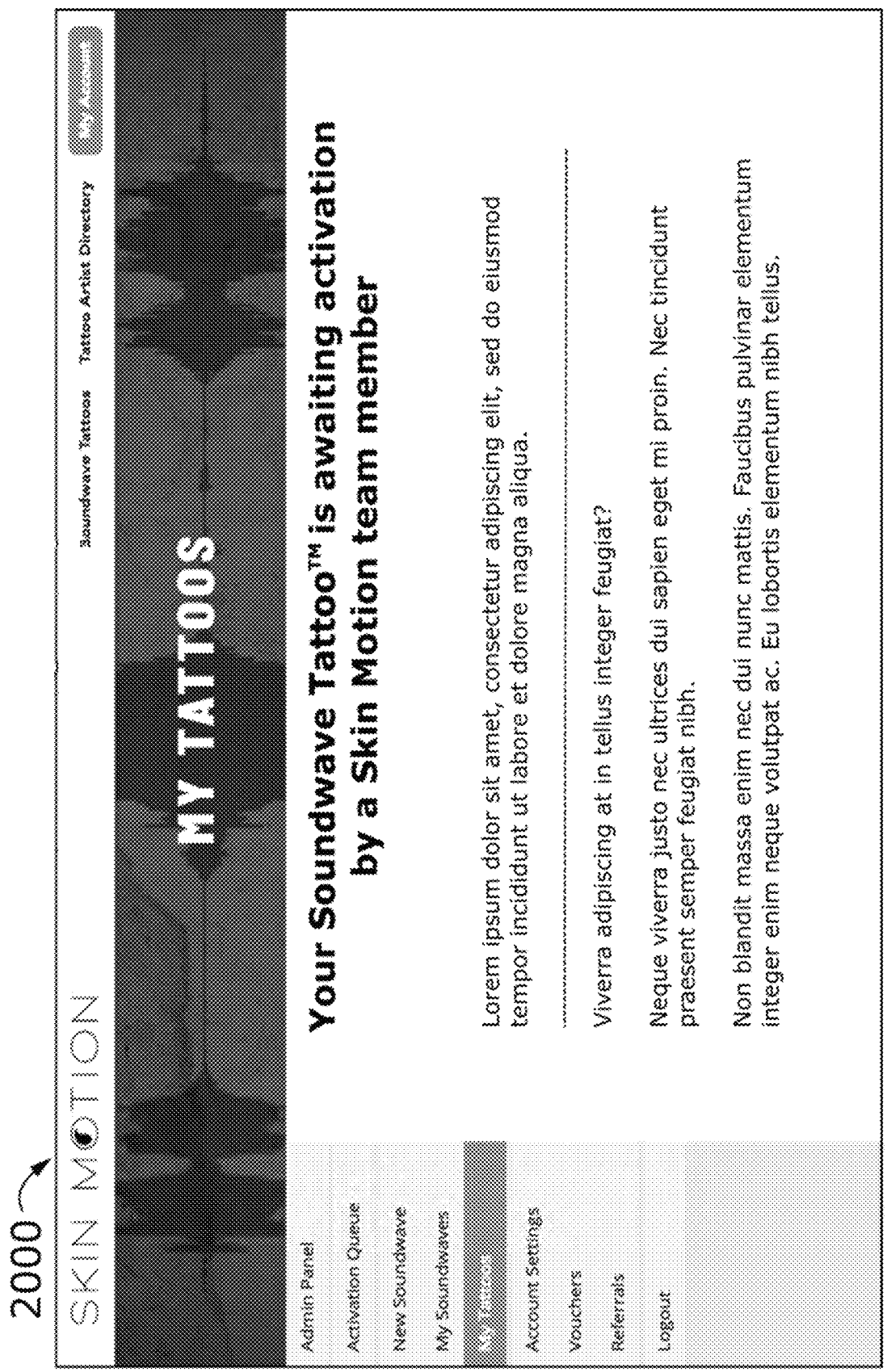

FIG. 20 is a screenshot of the tenth step in the method shown in the flowchart of FIG. 10.

Figure 21:
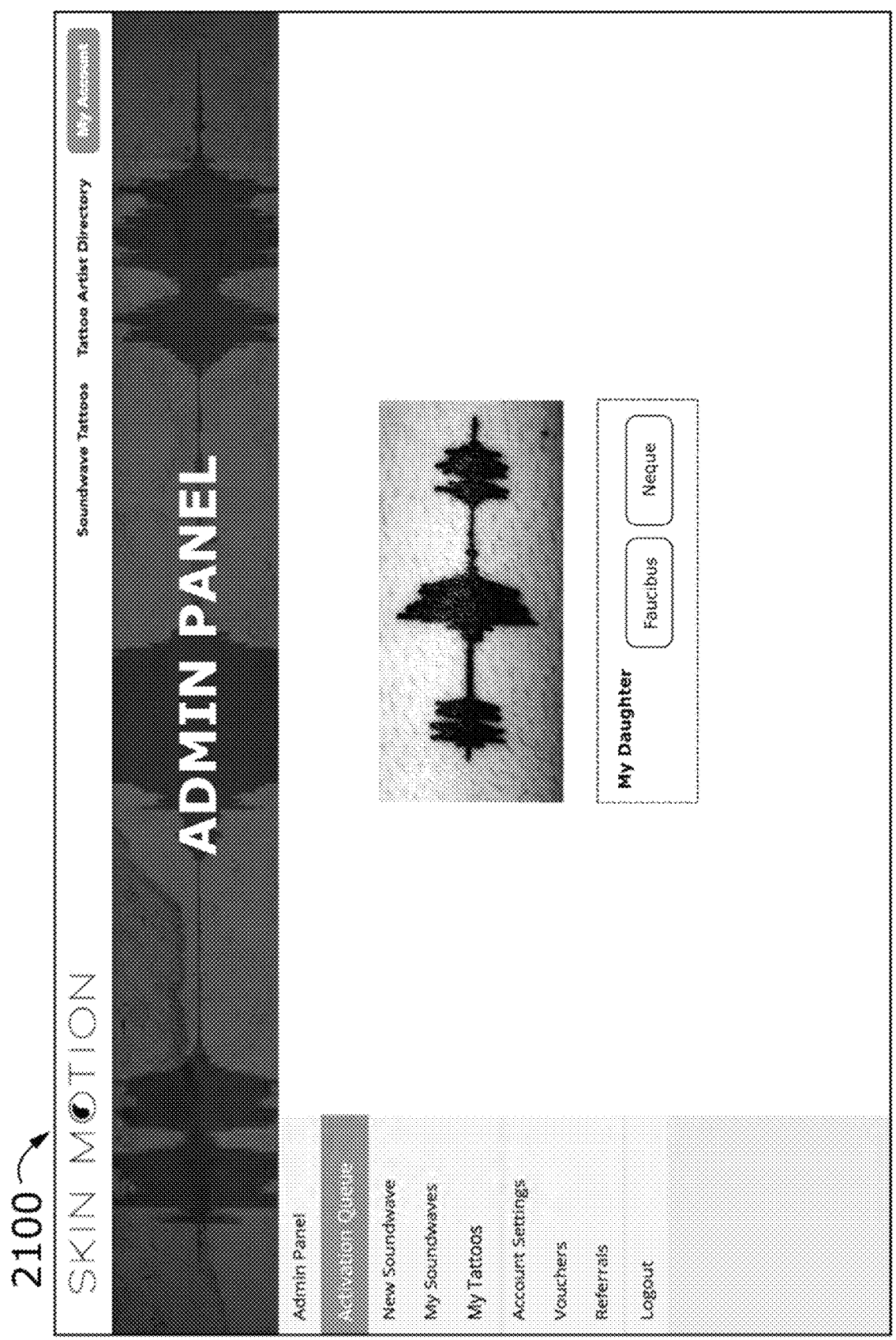

FIG. 21 is a screenshot of the eleventh step in the method shown in the flowchart of FIG. 10.

Figure 22:
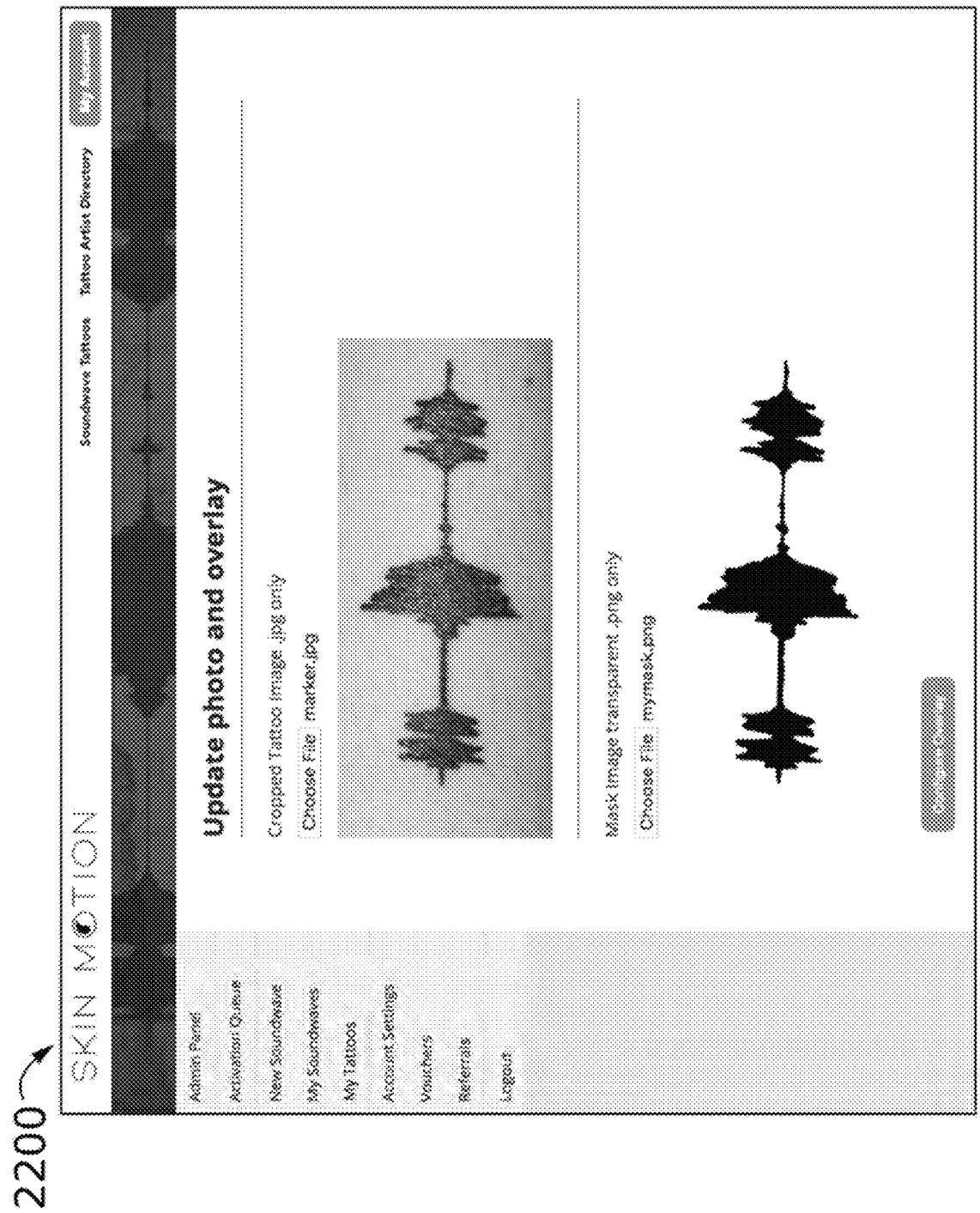

FIG. 22 is a screenshot of the twelfth step in the method shown in the flowchart of FIG. 10.

Figure 23:
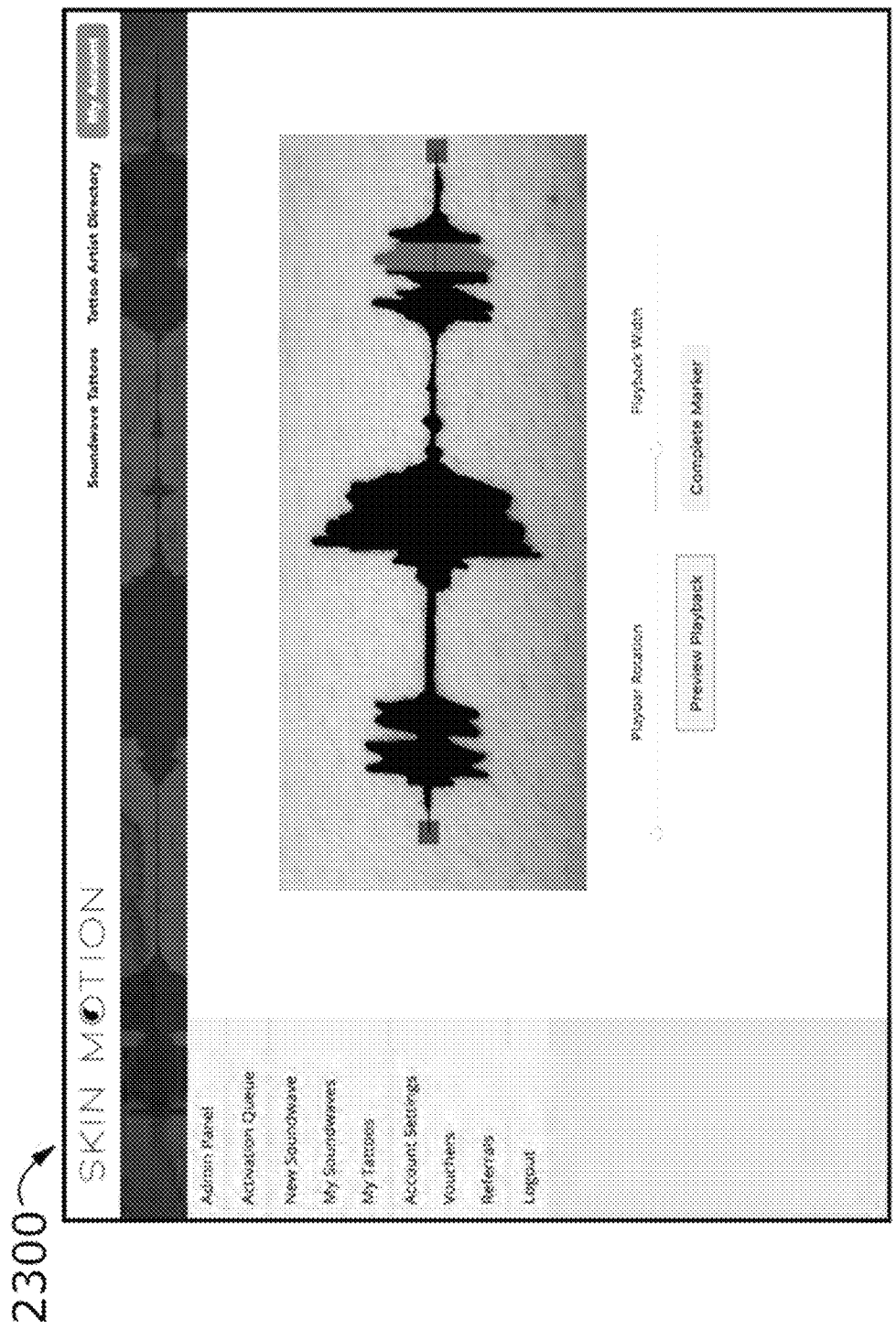

FIG. 23 is a screenshot of the thirteenth step in the method shown in the flowchart of FIG. 10.

Figure 24:
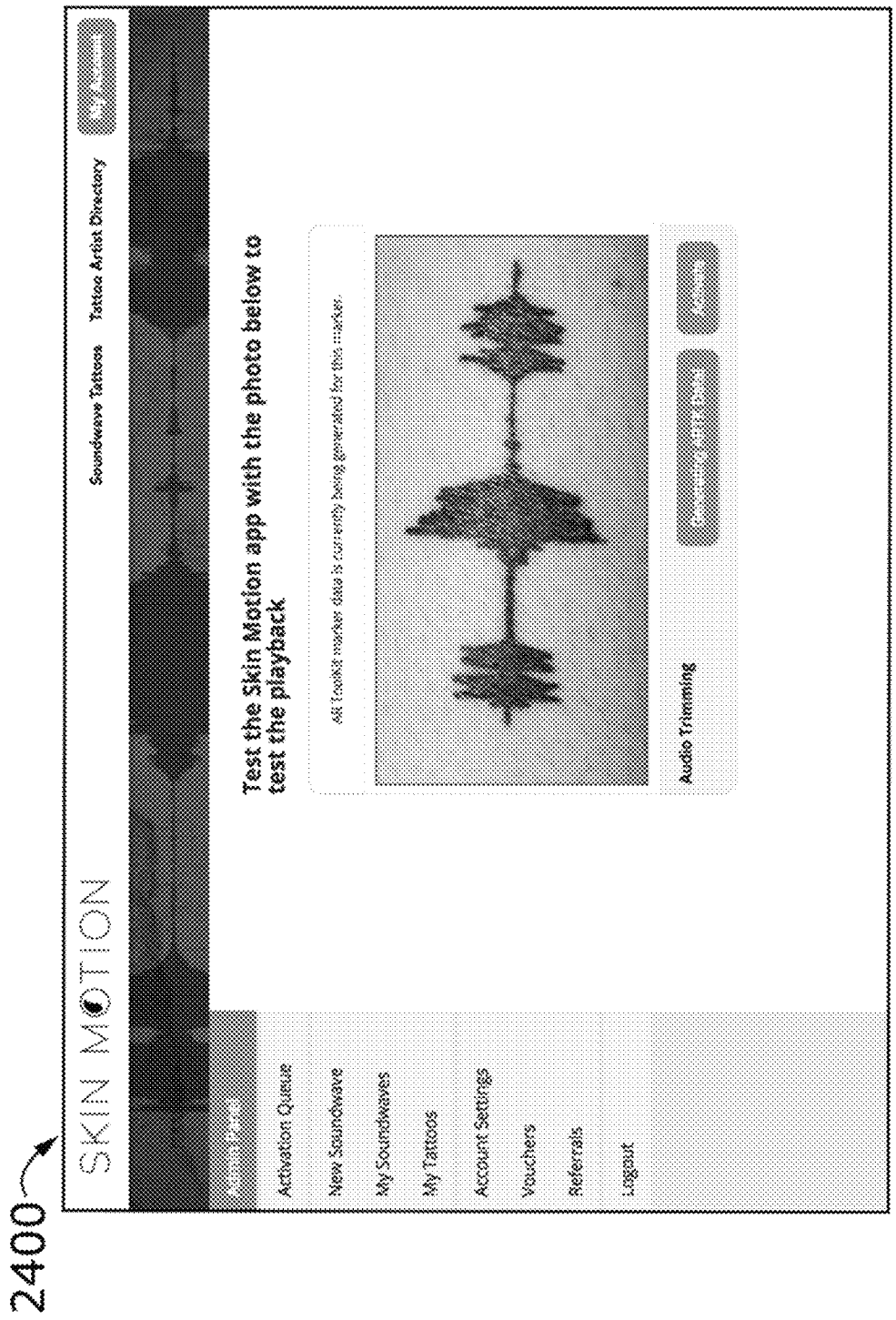

FIG. 24 is a screenshot of the thirteenth step in the method shown in the flowchart of FIG. 10.

Figure 25:
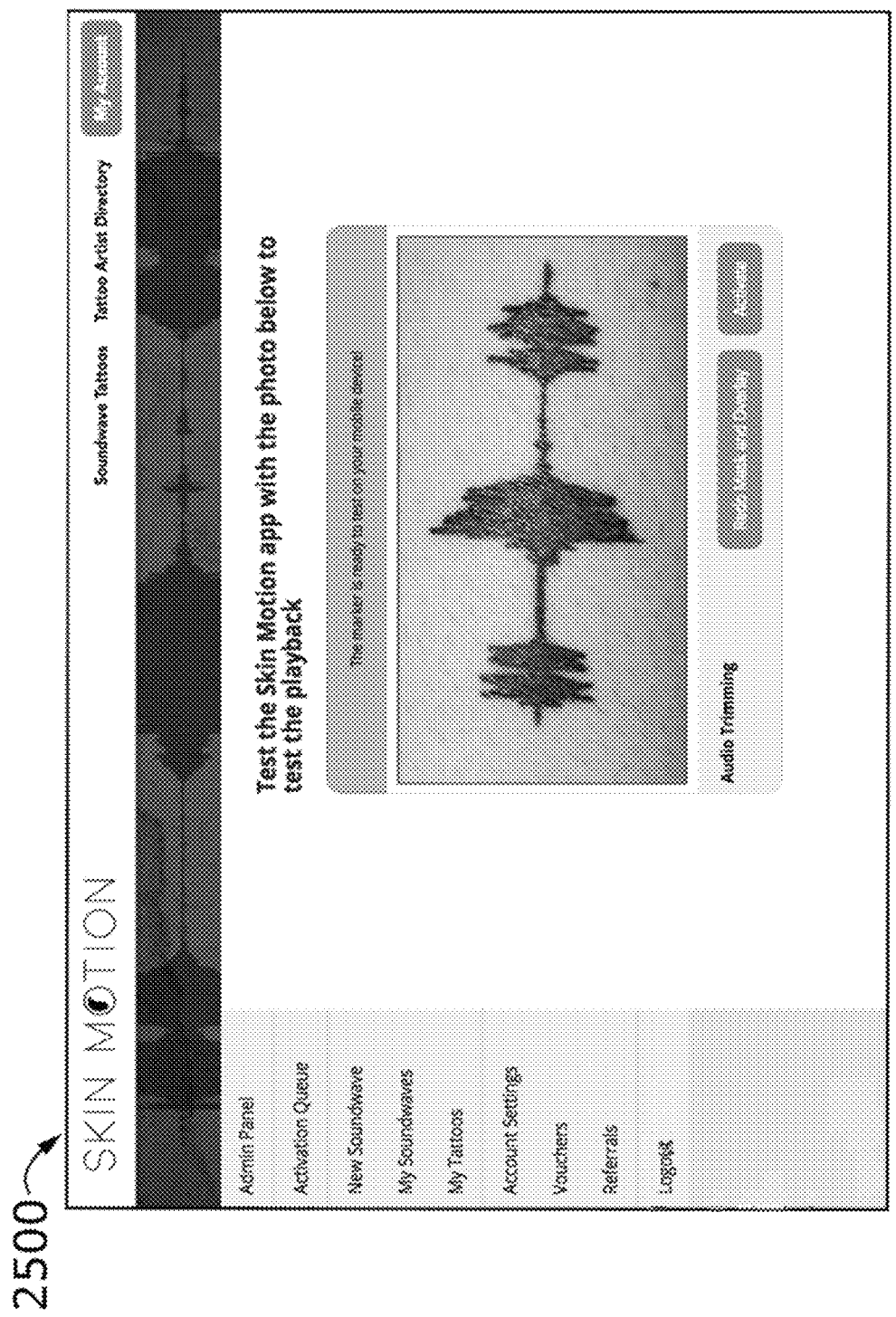

FIG. 25 is a screenshot of the final step in the method shown in the flowchart of FIG. 10.

Figure 26:
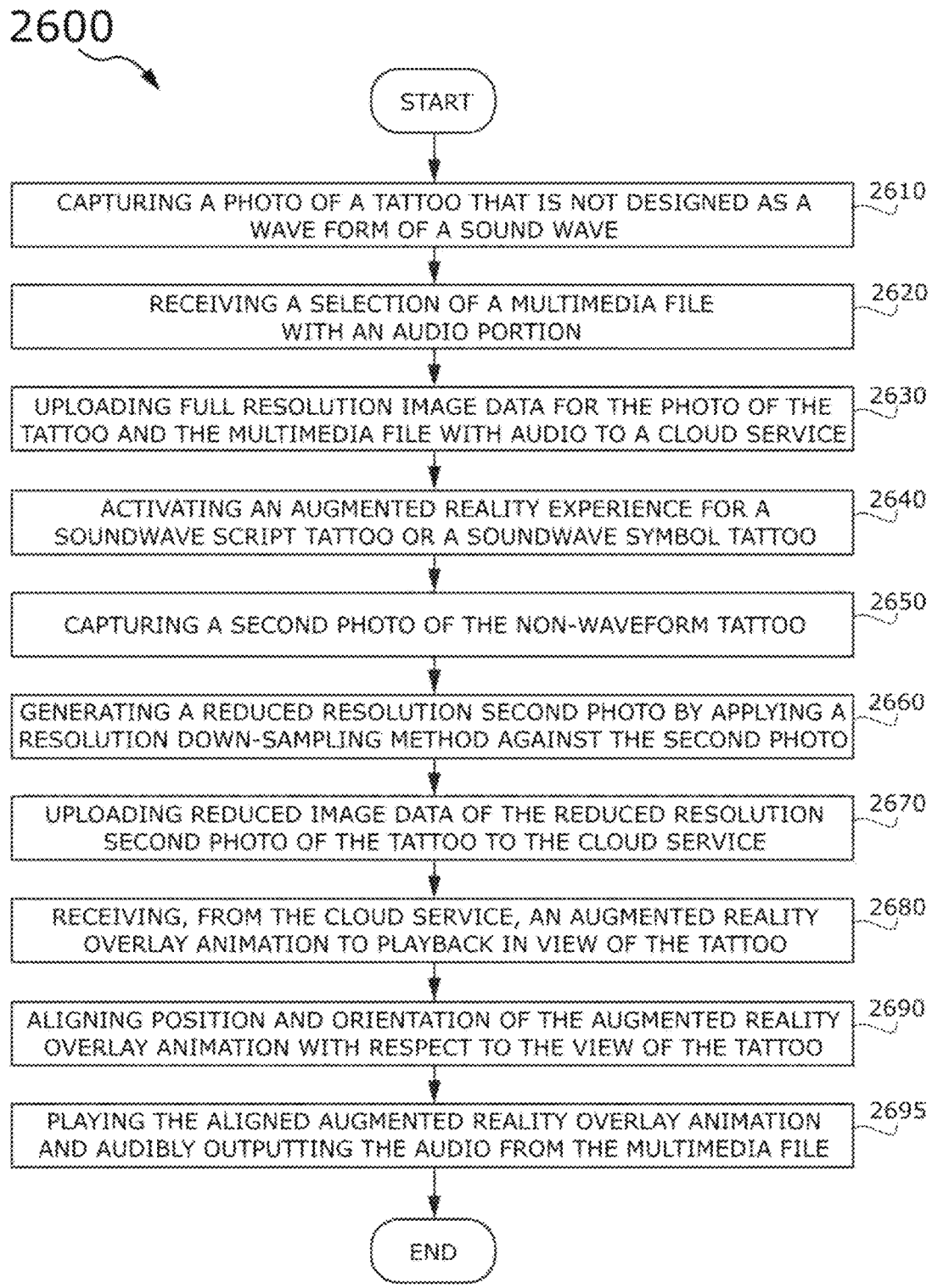

FIG. 26 conceptually illustrates a client-side customized augmented reality audio playback and graphical overlay visual presentation non-soundwave tattoo method in some embodiments.

Figure 27:
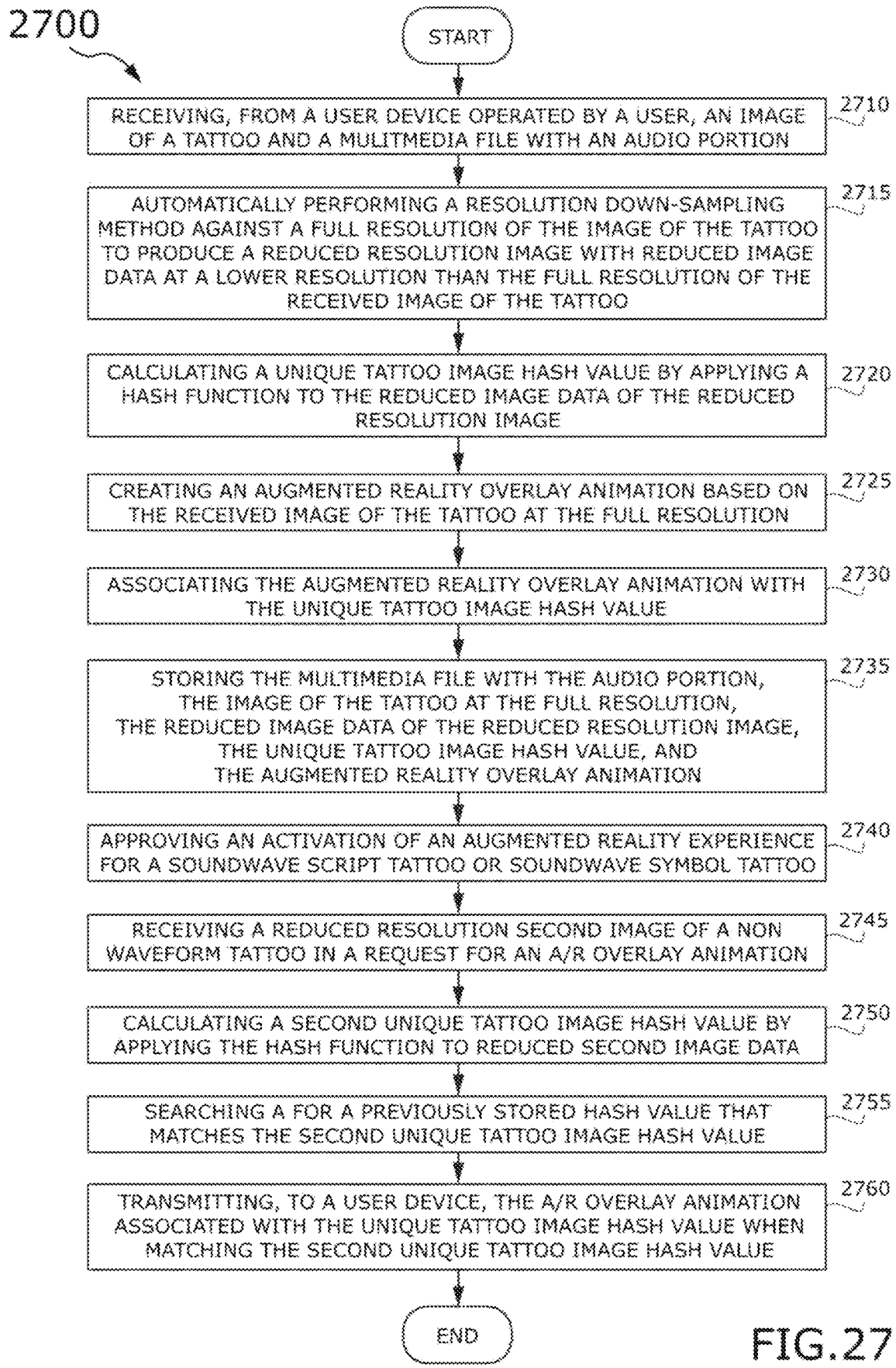

FIG. 27 conceptually illustrates a server-side customized augmented reality audio playback and graphical overlay visual presentation non-soundwave tattoo method in some embodiments.

Figure 28:

FIG. 28 conceptually illustrates an augmented reality experience for a soundwave script tattoo.

Figure 29:
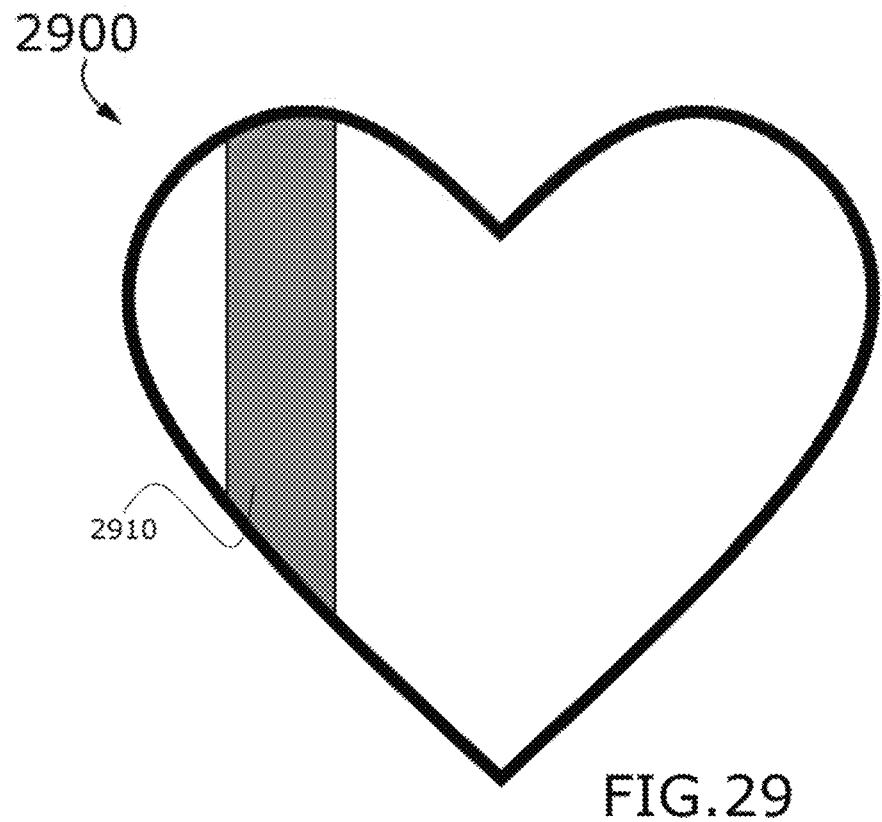

FIG. 29 conceptually illustrates an augmented reality experience for a soundwave symbol tattoo.

Figure 30:
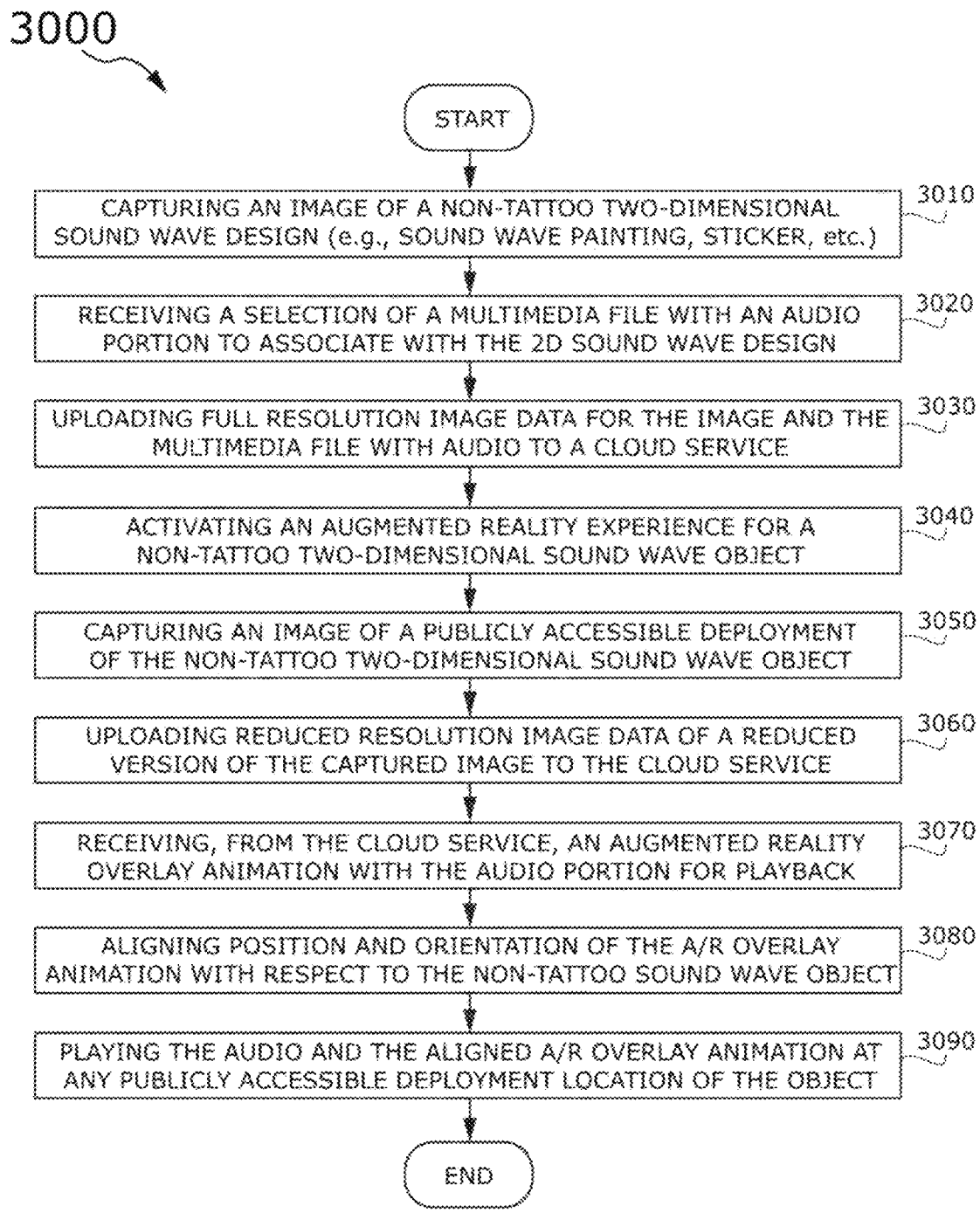

FIG. 30 conceptually illustrates a two-dimensional non-tattoo soundwave design method for creating and playing a customized augmented reality and graphical overlay audio-visual presentation for a two-dimensional non-tattoo soundwave object in some embodiments.

Figure 31:
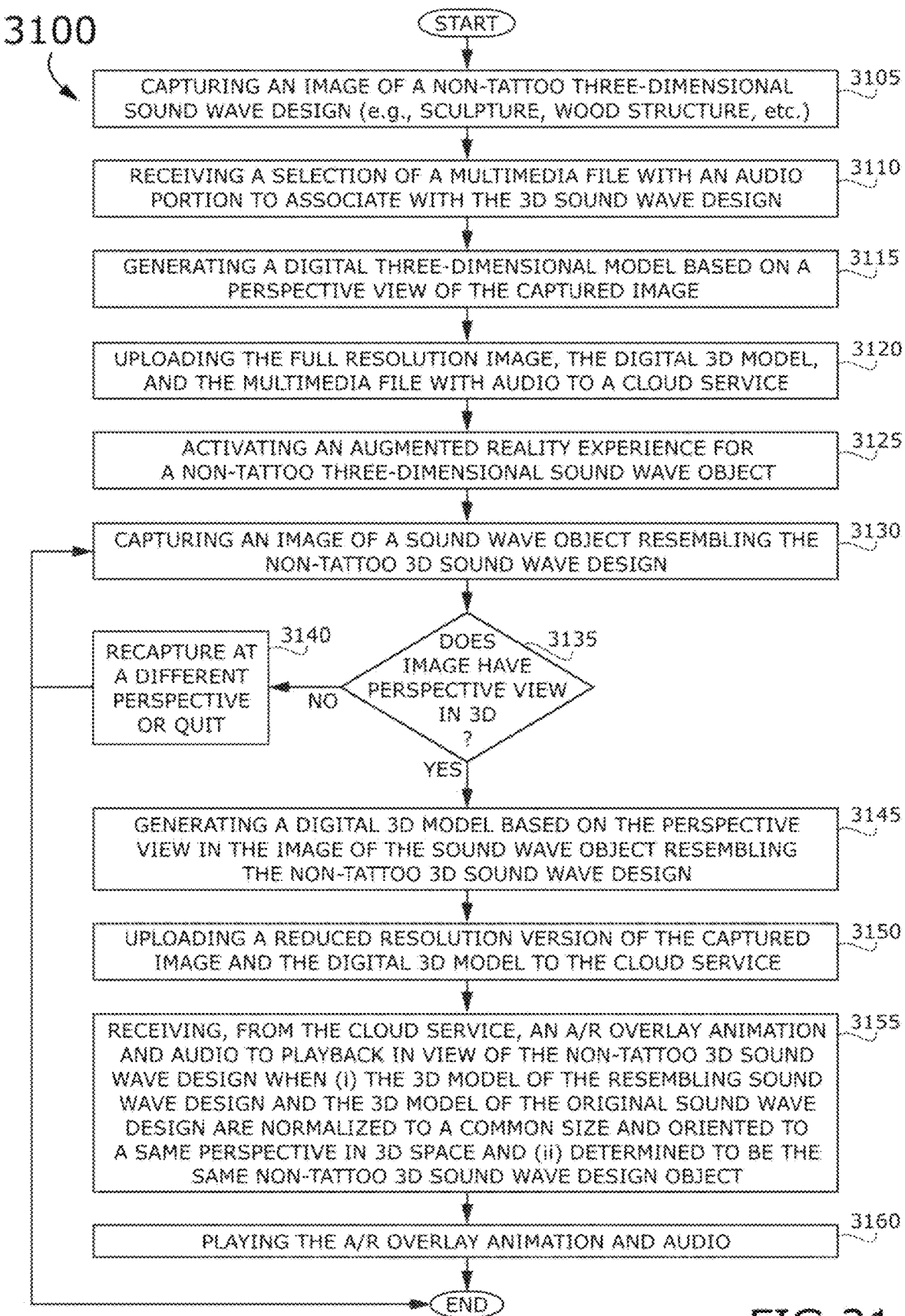

FIG. 31 conceptually illustrates a three-dimensional non-tattoo soundwave design method for creating and playing a customized augmented reality and graphical overlay audio-visual presentation for a three-dimensional non-tattoo soundwave object in some embodiments.

Figure 32:
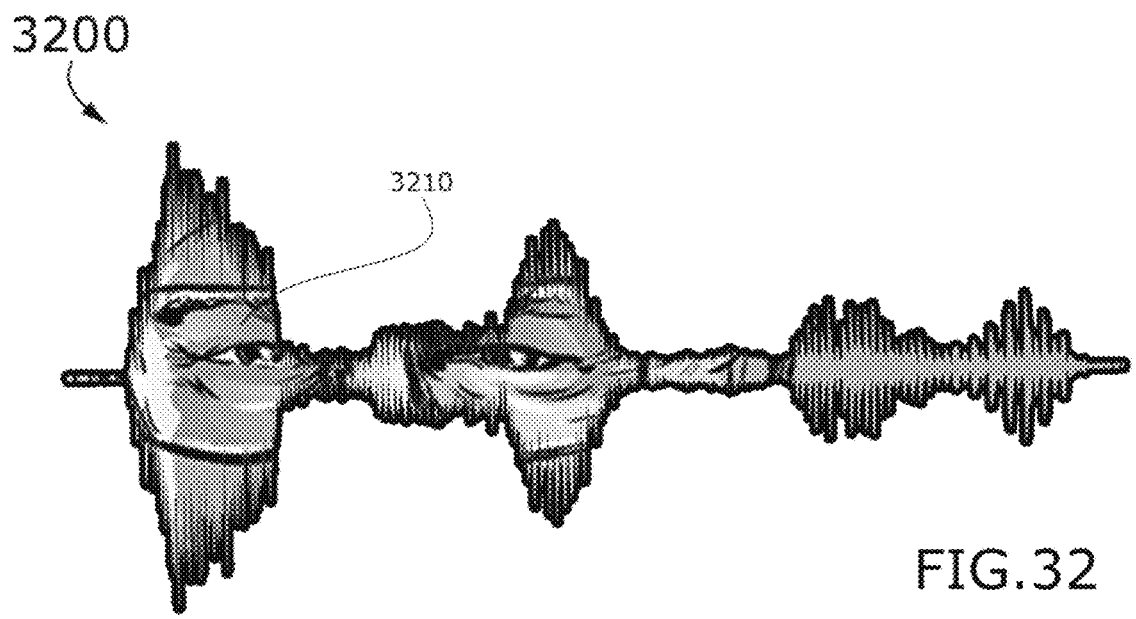

FIG. 32 shows an example of a two-dimensional non-tattoo soundwave design and a customized augmented reality graphical overlay.

Figure 33:
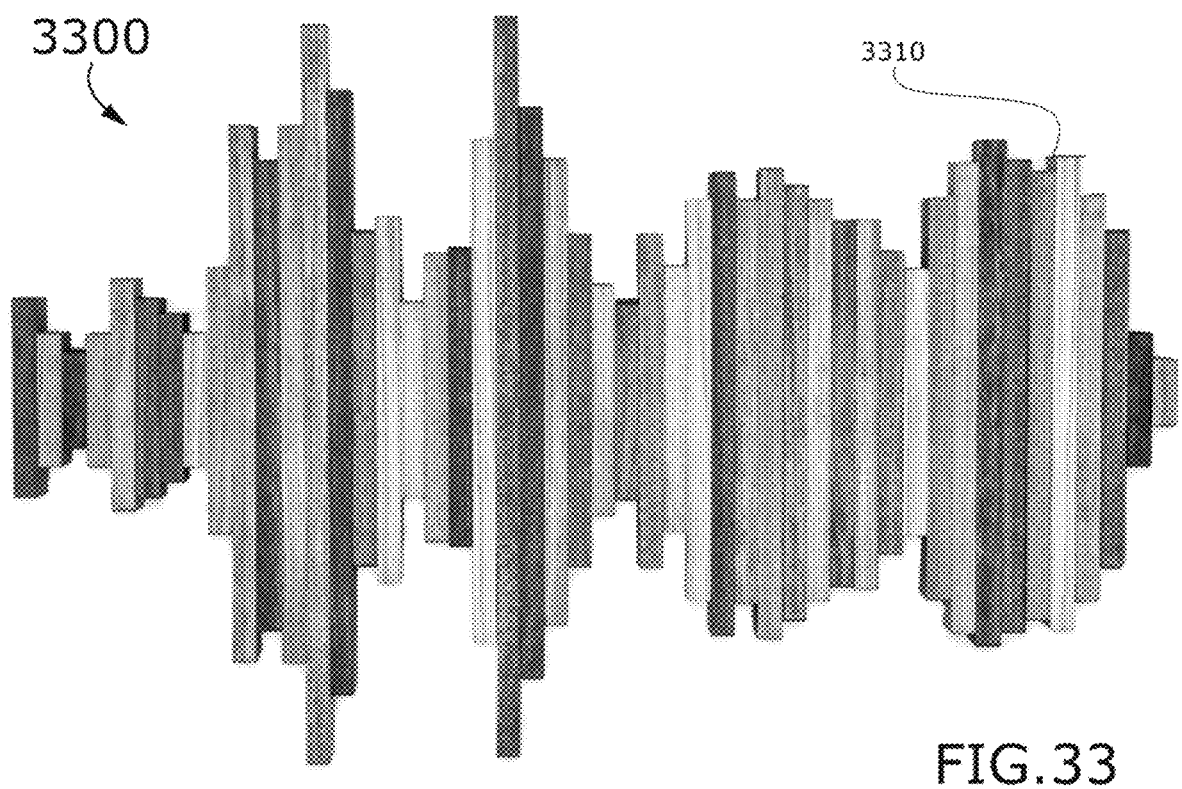

FIG. 33 shows an example of a three-dimensional non-tattoo soundwave design.

Figure 34:
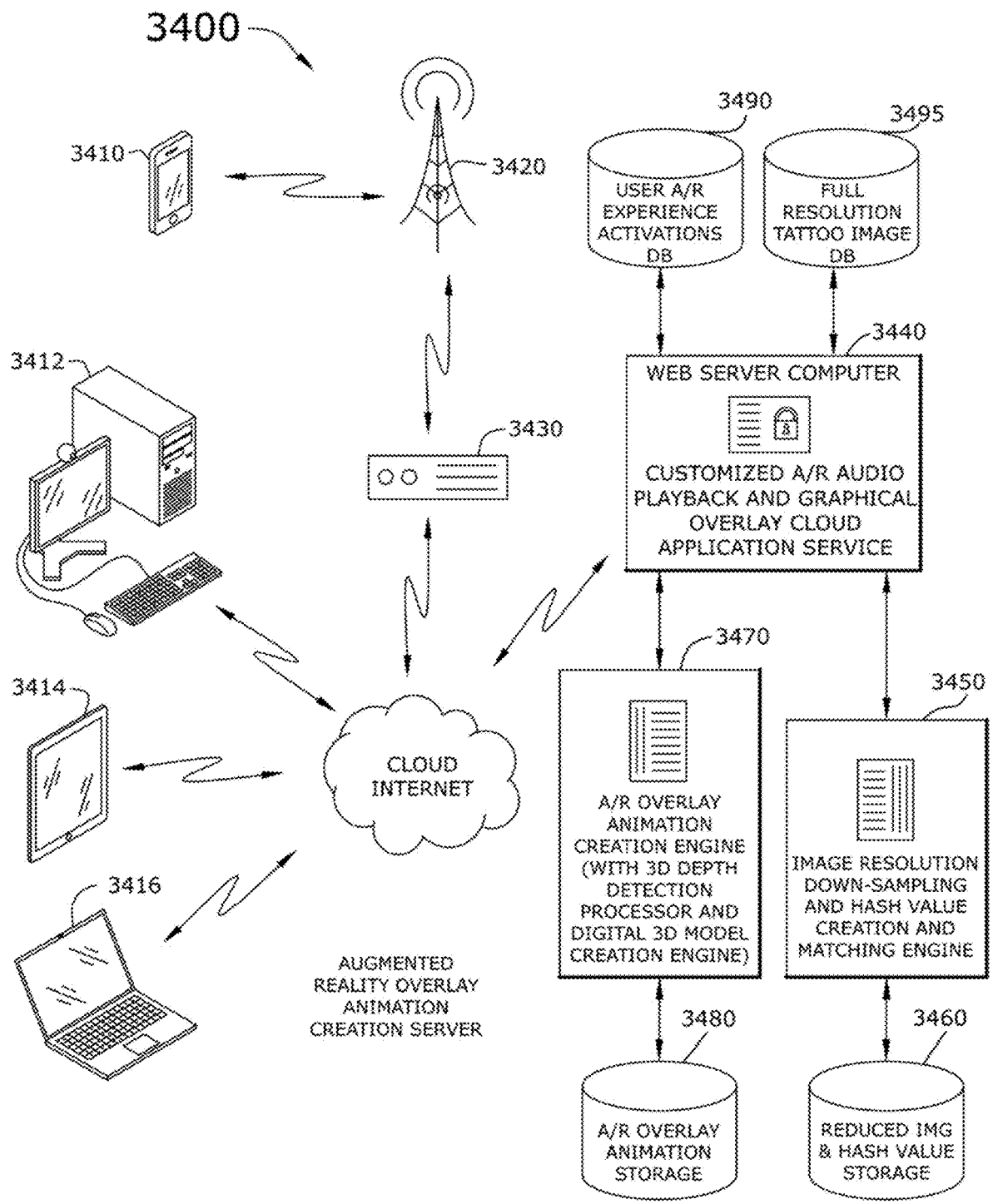

FIG. 34 conceptually illustrates a network architecture of a customized augmented reality audio playback and graphical overlay visual presentation system that hosts a cloud application service that is configured to provide augmented reality experiences in some embodiments.

Figure 35:
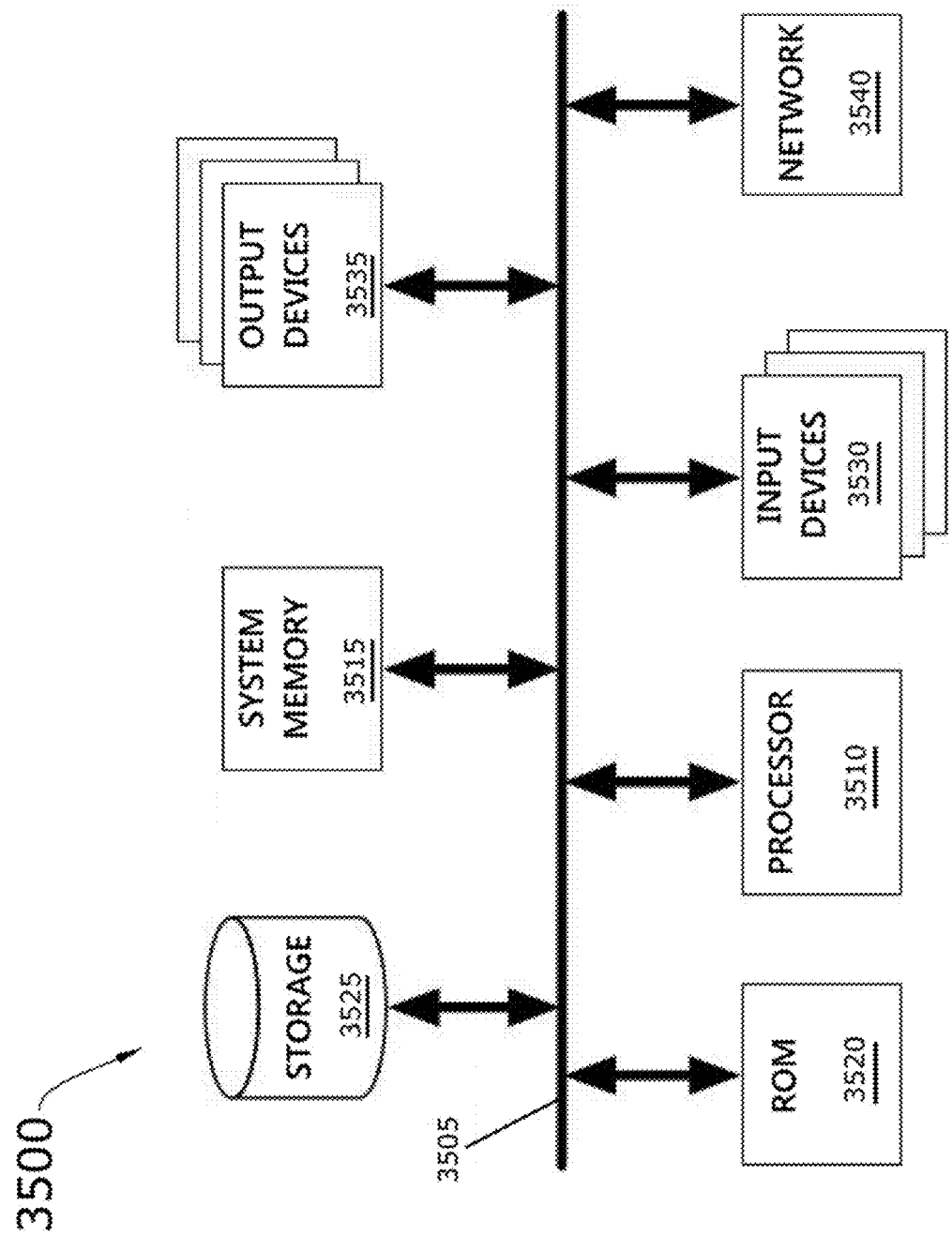

FIG. 35 conceptually illustrates an electronic system with which some embodiments of the invention are implemented.

DETAILED DESCRIPTION

In the following detailed description of the invention, numerous details, examples, and embodiments of the system and methods for personalizing augmented reality for individuals that is easy to use are described. However, it will be clear and apparent to one skilled in the art that the invention is not limited to the embodiments set forth and that the invention can be adapted for any of several applications. Also, all dimensions specified in this disclosure are by way of example only and are not intended to be limiting. Furthermore, the proportions shown in these Figures are not necessarily to scale. As will be understood by those of ordinary skill in the relevant art, the actual dimensions and proportions of any system, any device or part of a system or device disclosed in this specification will be determined by its intended use.

Methods and devices that implement the embodiments of the various features of the invention will now be described with reference to the drawings. The drawings and the associated descriptions are provided to illustrate embodiments of the invention and not to limit the scope of the invention. Reference in the specification to "one embodiment", "an embodiment", or "some embodiments" is intended to indicate that a particular feature, structure, or characteristic described in connection with the embodiment or embodiments is included in at least one embodiment, and possibly multiple embodiments, of the invention. The appearances of the phrases "in one embodiment", "an embodiment", or "some embodiments" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises", and "comprised" are not intended to exclude other additives, components, integers, or steps.

Also, it is noted that the embodiments may be described as a process that is depicted as a flowchart, a flow diagram, a structure diagram, or a block diagram. The flowcharts and block diagrams in the figures can illustrate the architecture, functionality, and operation of possible implementations of systems, methods and computer programs according to various embodiments disclosed. In this regard, each block in the flowchart or block diagrams can represent a module, segment, or portion of code, that can comprise one or more executable instructions for implementing the specified logical function(s). It should also be noted that, in some alternative implementations, the functions noted in the blocks may occur out of the order noted in the figures. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function. Additionally, each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Moreover, a storage may represent one or more devices for storing data, including read-only memory (ROM), random access memory (RAM), magnetic disk storage mediums, optical storage mediums, flash memory devices and/or other non-transitory machine readable mediums for storing information. The term "machine readable medium" includes, but is not limited to portable or fixed storage devices, optical storage devices, wireless channels and various other non-transitory mediums capable of storing, comprising, containing, executing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, distributed, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc. and are also referred to as an interface, where the interface is the point of interaction with software, or computer hardware, or with peripheral devices.

In the following description, certain terminology is used to describe certain features of one or more embodiments of the invention. The term "tattoo" refers to any permanent or temporary image that is placed on skin. The term "recording device" refers to any device that is a camera enabled playback device, such as, for example, a smartphone, a tablet, or augmented reality glasses, etc.

Various embodiments provide a system for augmented reality from tattoos. One embodiment of the present invention provides a system for augmented reality from tattoos. In another embodiment, there is provided a method for using the system. The system and method will now be disclosed in detail.

Referring now to FIG. 1, there is shown a diagram of a system 100 for personalizing augmented reality for individuals that is easy to use, according to one embodiment of the invention. The system comprises a central server 106 operably to a storage 108. The central server is communicatively coupled to one or more than one smart device 112 through the Internet 104 and 110. A user 102 uses a smart device 112 or a computing device (not shown) to access the central server 10 First, a person 102 selects or creates a personally meaningful multimedia object, for example a sound recording of a baby's first words. Then, a sound wave is generated from the selected multimedia object. Next, an image of the sound wave is generated of the resulting sound wave. The generated image of either the object or the image of the sound wave is then applied as a tattoo, either permanently or temporarily, to the person. An image of the applied tattoo, the generated image, and the multimedia object are uploaded, via the Internet, to a central server. The central server 106 automatically assigns a unique identification with all the uploaded data and the uploaded data and the unique identification are stored in a storage 108. Then a user with a smart device 112, such as, for example, a smartphone or a tablet, uses an application to view the tattoo on the person. The stored multimedia object 108 is then downloaded to the smart device 112, aligned and overlaid on the tattoo on the person, then the stored multimedia is played for the user from the central serve 106 via the Internet 110. As will be understood by those will skill in the art with reference to this disclosure, the multimedia object can be displayed on the person, next to the person, in front of or behind the person, depending on the sound wave and the multimedia object.

Referring now to FIG. 2, there is shown a diagram of a multimedia sound wave 200 useful for the system of FIG. 1. As can be seen, the multimedia sound wave 200 shows a recorded audio message waveform 202. The waveform 202 can be any multimedia, audio or video recording converted from an analog representation to a digital image. The waveform 202 is used to create a tattoo that will act as a unique identifier for playback and alignment of the stored augmented reality multimedia associated with the unique identifier. As will be understood by those will skill in the art with reference to this disclosure, each sound wave generated by a person is unique, making each sound wave a unique identifier. If the user selects a different type of multimedia to be stored and played back, the sound wave from that multimedia can also be used by itself or in conjunction with other indicia of the multimedia object to generate the unique identifier.

Referring now to FIG. 3, there is shown a tattoo 300 of the multimedia sound wave of FIG. 2. In this case, the analog representation of the waveform has been transferred to a person as a tattoo. As will be understood by those with skill in the art with reference to this disclosure, an exact duplication of the audio representation of the waveform is not possible in a tattoo. However, the system does not need an exact duplication of the audio waveform to operate correctly.

Referring now to FIG. 4, there is shown a diagram of a computer implemented method for creating an augmented reality overlay and unique identifier from a photo of the tattoo of FIG. 3. Once the multimedia sound wave form, an image of the tattoo, and an associated multimedia file, collectively the associated data, are uploaded to the system 100, an overlay is created either manually, automatically, or both manually and automatically. Once the overlay has been created, the system 100 creates a unique identifier from the photograph of the finished tattoo, or, in the case of a pre-designed tattoo, the unique identifier is created based on the original design. The unique identifier and all the associated data re then stored in a storage 108 for later retrieval by a user. As will be understood by those with skill in the art with reference to this disclosure, the timing of the overlay can coincide with the playback of the sound waveform. Preferably, the overly is a video overlay that is matched and aligned to the tattoo. Alternatively, other overlays are possible and the example presented here is not meant to be limiting, but shows only one contemplated aspect of the system.

Referring now to FIG. 5, there is shown a screenshot diagram 500 of uploading an image of the completed tattoo created from user generated multimedia. The image of the completed tattoo is converted into a unique identifier and both the image of the completed tattoo and the generated unique identifier are stored in the storage 108 on the central server 106 for later retrieval. As will be understood, the screenshot is only an example and not meant to be limiting. Other methods can be used to upload the required information to a central server 106 for later processing. For example, while at a theme park, a user can take a video of a theme park character's interaction with a child or a group and record that interaction on a recording device. The user can then upload the video of the interaction to the central server 106 that will process the video and produce an output such as a temporary tattoo that a child could wear. In another example, multiple copies of a pre-designed temporary tattoo can be distributed so that a group of people can experience a personal interaction with a character or other significant even. A specialized temporary tattoo printer can be utilized to customize each of the pre-designed temporary tattoos, or a permanent tattoo can be customized and made unique to the person. When another person, with the appropriate application, takes an image of the temporary tattoo, the entire interaction can be played back, or an edited version of the interaction can be played back, or just the sounds can be played back.

Additionally, commercialization of the system 100 is possible, by inserting special or specific multimedia, however, the memory is still personal. For example, a birthday party at a theme park or other attraction location can add a special message from a star of the theme park or attraction, such as a custom message from a cartoon character wishing a happy birthday to the guest of honor. A memory that can be made into a temporary or permanent tattoo and played back.

Many different personalizations of a memory are possible with the system 100, unlike the prior art. Unlike a photo book that can be lost or destroyed, a permanent memory can be tattooed on a person and whenever the person desires, the memory can be re-lived only using a recording device. The memory can be shared with others without the need to be in a specific place or sorting through hundreds of stored photos and videos.

Referring now to FIG. 6, there is shown a screenshot diagram 600 showing the system 100 masking the tattoo to create a unique identifier from the uploaded image of the completed tattoo to prepare it for image recognition. The blue/gray portions are masked so as to not be analyzed by the system 100. This step can be avoided by cropping the image in the first place on the backend before the image of the completed tattoo is uploaded and stored 108 on the central server 106.

An application running on a smart device 112, such as for example, a smartphone or a tablet with a camera, captures an image or a live video of the tattoo. The image or live video is then sent to the central server and the associated overlay and multimedia content are retrieved and downloaded or streamed to the smart device 112 and the personalized multimedia augmented reality is shown to the user.

Referring now to FIG. 7, there is shown a diagram 700 of an application that assigns a unique identifier to the image of the tattoo for playback and alignment of a stored multimedia. Here is shown how the unique identifier is created and assigned to the associated data stored in the storage of the central server. Additionally, the alignment to the stored image is created to be displayed over, and in relation to, the tattooed area stored in the image of the sound waveform. The overlay is moved along the sound waveform to show the progress of the sound waveform as it played.

Referring now to FIG. 8, there is shown a screenshot 800 of an application for playback and alignment of a stored multimedia file identified using the unique identifier. A user downloads the application from the central server 106 onto a smart device 112 and then takes an image or scans the tattooed area using the application. Then, the input image is analyzed within the application using instructions for image recognition to find the associated unique identifier. Next, the unique identifier is sent to the central server 106 where the corresponding associated data is stored 106. Next, the associated data corresponding to the unique identifier is sent back to the smart device 112 and the augmented reality is shown on the smartphone. In this case, the augmented reality is a moving color outline 802 of the sound wave. The moving color is displayed on the smart device as an overlay to the image. The associated data is retrieved from the storage 108, sent to the smart device 112 for playback coincident with the image and the moving color outline 802.

Referring now to FIG. 9, there is shown a flowchart diagram 900 of some steps of a method for implementing the system 100. The computer implemented method comprises instructions executable on a processor for personalizing augmented reality for individuals that is easy to use. First, a user selects (at 902) a multimedia file to be converted. Then, the multimedia file is converted (at 904) into a sound waveform tattoo. Next, a photograph (at 906) of a completed tattoo is taken. Then, the multimedia file, the converted sound waveform tattoo, and the photograph of the completed tattoo are uploaded (at 908) to the central server. Optionally, the pre-designed tattoo images and the associated data can also be uploaded to the central server 106 for commercial applications of the system 100. Next, a unique identifier is created (at 910) for all the uploaded data, collectively the associated data. Then, an animated augmented reality overlay is created (at 912) and stored with the associated data. The animated augmented reality overlay can be created manually, automatically, or both manually and automatically. Next, an augmented reality application is initialized or used (at 914) to take an image or scan of the tattoo on the user's skin using a camera enabled device. The image or scan is used by image recognition in the application to determine the unique identifier of the associated data and to locate the associated data stored in the central server 106. Then, the tattoo image is identified (at 916) by the system 100 using the unique identifier determined by image recognition. Next, the associated data is downloaded (at 918) to the camera enabled smart device 112. Finally, the augmented reality is overlaid and aligned (at 920) in relation to the live image captured or scanned by the camera enabled smart device 112 and the stored multimedia is displayed on the camera enabled device with all the options stored in the associated data.

Referring now to FIG. 10, there is shown a flowchart diagram 1000 of some steps of another method for implementing the system of FIG. 1. First, a user uploads (at 1002) an audio or multimedia file to the central server 106. For any multimedia file other than strictly an audio file, the audio portion of the multimedia file is used for the remaining steps. Then, the user enters a name (at 1004) for the sound wave resulting from the audio portion of the uploaded multimedia file. Next, the user can manually, automatically, or both manually and automatically edit the sound wave of the audio (at 1006). Then, the central server executes instructions to generate a tattoo (at 1008) from the edited sound wave of the audio. The tattoo is generated as a two-dimensional image, and may be printed or saved as a file (e.g., an image file, a PDF file, etc.). Next, the user purchases an activation (at 1010) to enable the playback of the uploaded audio or multimedia file. Then, the user goes to a tattoo artist and receives a tattoo (at 1012) similar to the generated tattoo. Optionally, the user can access a tattoo artist directory to select the tattoo artist (at 1013). In some embodiments, selecting a tattoo artist from the tattoo artist directory (at 1013) activates a guarantee that the selected tattoo artist will orient the sound wave applied to the user's skin in the way supported and replicate the shape of the sound wave as precisely as possible on the skin of the user. In some embodiments, selection of the tattoo artist from the tattoo artist directory (at 1013) automatically causes the two-dimensional image of the generated tattoo to be transmitted to the selected tattoo artist. At some time after these preliminary steps, the user visits the tattoo artist to get the generated tattoo applied to their skin. Then, after the actual tattoo of the sound wave is applied to the user's skin, the user takes an image of their tattoo (at 1014). Then, the user uploads (at 1016) that tattoo image. Next, the user selects a color (at 1018) for the augmented reality overlay playback. Then, the user activates (at 1020) playback of their tattoo (applied to skin). Next, a mask is created (at 1022) by the central server 106. Then, a start point and an end point for playback (at 1024) are determined either manually, automatically or both manually and automatically. Finally, the user tests the playback (at 1026) to insure that the system 100 is functioning and the audio is played back.

Referring now to FIG. 11, there is shown a screenshot of an interface 1100 for carrying out the first step in the method 1000 shown in the flowchart of FIG. 10. The screenshot depicts an interface 1100 through which a user may upload (at 1002) an audio or multimedia file to the central server 106. As noted, for any multimedia file other than strictly an audio file, the audio portion of the multimedia file is used for the remaining steps. Also, the unique identifier is determined by the central server 106 using the uploaded audio file.

Referring now to FIG. 12, there is shown a screenshot of an interface 1200 for carrying out the second step in the method 1000 shown in the flowchart of FIG. 10. The screenshot depicts an interface 1200 through which the user may name the sound wave (at 1004) by entering a name and clicking a continue button.

Referring now to FIG. 13, there is shown a screenshot of an interface 1300 for carrying out the third step in the method 1000 shown in the flowchart of FIG. 10. The screenshot depicts an interface 1300 for carrying out the step of the user manually, automatically, or both manually and automatically editing the audio file (at 1006).

Referring now to FIG. 14, there is shown a screenshot of an interface 1400 for carrying out the fourth step in the method 1000 shown in the flowchart of FIG. 10. The screenshot depicts an interface 1400 for carrying out the step of the central server 106 executing instructions to generate a tattoo (at 1008) from the edited sound wave, with additional instructions for the user to follow in applying the generated tattoo to their own skin.

Referring now to FIG. 15, there is shown a screenshot of an interface 1500 for carrying out the fifth step in the method 1000 shown in the flowchart of FIG. 10. The screenshot depicts an interface 1500 through which the user may purchase an activation (at 1010) of the sound wave tattoo to enable the playback of the uploaded audio or multimedia file.

Referring now to FIG. 16, there is shown a screenshot of an interface 1600 for carrying out the sixth step in the method 1000 shown in the flowchart of FIG. 10. The screenshot depicts an interface 1600 for getting a tattoo (at 1012) and the optional step of selecting the tattoo artist (at 1013) to active the precision and alignment orientation guarantee.

Referring now to FIG. 17, there is shown a screenshot of an interface 1700 with instructions for carrying out the seventh and eighth steps in the method 1000 shown in the flowchart of FIG. 10. The screenshot depicts an interface 1700 with instructions for taking a photo (or image) of the tattoo (at 1014) as applied to the user's skin and a selectable 'Upload Tattoo Photo' interface button to upload the photo (or image) of the tattoo (at 1016) as applied to their skin.

Referring now to FIG. 18, there is shown a screenshot of a file selection tool 1800 in the interface 1700. The file selection tool 1800 is for selecting the photo (or image) of the tattoo after the user selects the 'Upload Tattoo Photo' interface button in the interface 1700. From the file selection tool 1800, the user selects the photo (or image of the tattoo) as a file in known image formats (e.g., jpg, png, bmp, etc.), thereby allowing the user to complete the eighth step in the method 1000 shown in the flowchart of FIG. 10.

Referring now to FIG. 19, there is shown a screenshot of an interface 1900 for carrying out the ninth step in the method 1000 shown in the flowchart of FIG. 10. The screenshot depicts an interface 1900 with a color selection window through which the user may select a particular color for playback of the augmented reality overlay. In this example, a checkerboard pattern represents a color selected by the user. In this way, the user is able to carry out the step of selecting a color (at 1018) for the augmented reality overlay playback.

Referring now to FIG. 20, there is shown a screenshot of an interface 2000 with information and instructions for activating the sound wave tattoo, as noted in the tenth step of the user activating (at 1020) playback of their tattoo in the method 1000 shown in the flowchart of FIG. 10. The screenshot of the interface 2000 indicates that activation of the sound wave tattoo has been initiated by the user and is currently awaiting final activation by an authorized user (e.g., a team member of an entity that provides the software implementation and system).

Referring now to FIG. 21, there is shown a screenshot of an admin panel interface 2100 in which the photo (image) of the tattoo and name "My Daughter" is present in an activation queue for the authorized user to approve (or reject).

Referring now to FIG. 22, there is shown a screenshot of an interface 2200 for carrying out the eleventh step in the method 1000 shown in the flowchart of FIG. 10. The screenshot depicts an interface 2200 for creating a mask (at 1022) by the central server 106.

Referring now to FIG. 23, there is shown a screenshot of an interface 2300 selecting start and end points for playback as the thirteenth step in the method 1000 shown in the flowchart of FIG. 10. The screenshot depicts an interface 2300 through which the user may select, change, or update start and end points the corresponding step of determining (either manually, automatically or both manually and automatically) the start point and the end point selected by the user for playback (at 1024).

Referring now to FIGS. 24 and 25, there are shown screenshots of interfaces 2400 and 2500, respectively, which demonstrate the final step in the method 1000 shown in the flowchart of FIG. 10. Specifically, the interface 2400 depicts generation of augmented reality toolkit data and interface 2500 depicts a notification that playback testing (at 1026) is ready to proceed.

In some embodiments, any tattoo design that is not a wave form of a sound wave can be associated with an audio clip and augmented reality overlay for playback of the audio clip when the tattoo design is captured or scanned. In some embodiments, the customized augmented reality audio playback and graphical overlay visual presentation methods are for audibly outputting sound associated with a tattoo image of an object that is not a wave form of a sound wave and visually outputting a customized overlay associated with the tattoo image of the object in view of, and aligned with, the actual tattoo. An example of a client-side customized augmented reality audio playback and graphical overlay visual presentation non-soundwave tattoo method is described below, by reference to FIG. 26. Also, an example of a server-side customized augmented reality audio playback and graphical overlay visual presentation non-soundwave tattoo method is described below, by reference to FIG. 27.

In some embodiments, the image of the object comprises a scripted expression tattoo (hereinafter referred to as a "soundwave script tattoo" or, simply, a "soundwave script") that is associated with an audio clip and an augmented reality overlay for playback of the audio clip when the soundwave script tattoo is captured or scanned. For example, capturing or scanning an image of a tattoo expressed in written words or script would be an example of a soundwave script (e.g., a tattoo of the word "Love" in a cursive script, a tattoo of the expression "Free Will" in a cursive script, a tattoo of a person's signature). An example of a soundwave script is described below, by reference to FIG. 28.

In some embodiments, the image of the object comprises a shape or symbol tattoo (hereinafter referred to as a "soundwave symbol tattoo" or, simply, a "soundwave symbol") that is associated with an audio clip and an augmented reality overlay for playback of the audio clip when the soundwave symbol tattoo is captured or scanned. For example, capturing or scanning an image of a tattoo expressed as a symbol or a shape would be an example of a soundwave symbol (e.g., a heart shaped symbol applied as a tattoo). An example of a soundwave symbol is described below, by reference to FIG. 29.

By way of example, FIG. 26 conceptually illustrates a client-side customized augmented reality audio playback and graphical overlay visual presentation non-soundwave tattoo method 2600. As shown in this figure, the client-side customized augmented reality audio playback and graphical overlay visual presentation non-soundwave tattoo method 2600 starts with a user capturing a photo of a tattoo (at 2610). The photo may be captured by a camera-enabled user device which has a software application installed for processing tattoo images and presenting custom augmented reality experiences in connection with the tattoo. The user may be operating the camera manually to capture the photo, or the photo capture may be automated in some way. Also, the user may have the tattoo applied to their skin or the tattoo may be applied to the skin of another person. Alternately, the tattoo may be a design of a tattoo, such as for a temporary tattoo. Whatever the tattoo medium (skin, temporary tattoo, etc.), the photo is captured by the camera-enabled user device in a full resolution. Note, however, the client-side customized augmented reality audio playback and graphical overlay visual presentation non-soundwave tattoo method 2600 is different from many of the descriptions noted above due to the fact that the tattoo being captured in this case is not in the form of a soundwave or wave form.

Next, the client-side customized augmented reality audio playback and graphical overlay visual presentation non-soundwave tattoo method 2600 receives a user selection of a multimedia file with an audio portion (at 2620). The user selection of the multimedia file with the audio portion may be made by the user interacting with the software running on the camera-enabled user device, or may be automated in some way.

In some embodiments, the client-side customized augmented reality audio playback and graphical overlay visual presentation non-soundwave tattoo method 2600 proceeds to a step for uploading, to a cloud application service that is configured to create an augmented reality overlay, full resolution image data of the captured photo and the multimedia file with the audio portion (at 2630). In some embodiments, the full resolution image data is uploaded through the software application, which is running on the camera-enabled user device and is communicably connected (over the Internet) to the cloud application service. The cloud application service itself is configured to automatically perform a resolution down-sampling method against the full resolution image data for the photo of the tattoo and the down-sampling method produces a reduced resolution photo of the tattoo which includes reduced image data at a lower resolution than the full resolution image data for the photo of the tattoo.

Furthermore, the cloud application service of some embodiments is configured to calculate a unique tattoo image hash value by applying a hash function to the reduced image data of the reduced resolution photo of the tattoo. The cloud application service stores the unique tattoo image hash value in a storage, along with one or more of the reduced image data of the reduced resolution photo of the tattoo, the full resolution image data for the photo, and the multimedia file with the audio portion. The unique tattoo image hash value may be stored in a database or a lookup table (LUT) in order to use later for comparisons and searches.

In some embodiments, the client-side customized augmented reality audio playback and graphical overlay visual presentation non-soundwave tattoo method 2600 proceeds to a step at which the user initiates activation (at 2640) of an augmented reality experience for a soundwave script tattoo or a soundwave symbol tattoo in connection with the tattoo and multimedia. The user may purchase activation or may enter a code of an activation by a sponsor. Once activated, the user may decide to test the augmented reality experience by capturing a second photo of the tattoo (at 2650). Alternatively, the user may activate the augmented reality experience and wait for some time before testing or actually using the software application to demonstrate or view the augmented reality experience in view of the tattoo.

Regardless of when the user captures the second photo of the tattoo, the client-side customized augmented reality audio playback and graphical overlay visual presentation non-soundwave tattoo method 2600 moves ahead to a step for generating a reduced resolution second photo of the tattoo with reduced second image data (at 2660). In some embodiments, the reduced resolution second photo with reduced second image data is generated by performing a resolution down-sampling method to reduce resolution of the second photo. In some embodiments, the reduced resolution second photo with reduced second image data ensures that the image can be transmitted to the cloud application service quickly so that the augmented reality experience can be viewed in approximate realtime as the user is viewing the tattoo through the camera-enabled user device. Furthermore, reducing resolution of the second photo allows for comparison to the original photo of the tattoo in a way that does not require 100% exact pixel-by-pixel (or data bit-by-bit) matching of the full resolution versions of the photos. In other words, by lowering resolution, it is possible to compare with original photo at the lower resolution in order to objectively identify matching photos, despite the real-world circumstances that result in subtle differences (e.g., tanning/fading of skin over time, ambient light differences between the photos, angle and orientation of tattoo when captured, etc.).

After reducing the resolution, the client-side customized augmented reality audio playback and graphical overlay visual presentation non-soundwave tattoo method 2600 carries out the step for uploading the second reduced image data of the reduced resolution second photo (at 2670) to the cloud application service.

In some embodiments, the cloud application service is configured to calculate a second unique tattoo image hash value by applying the hash function to the second reduced image data of the reduced resolution second photo of the tattoo. Generally, higher resolution images include many more data points (pixel data) than lower resolution versions of the same images. As such, two full resolution images taken only milliseconds apart by an automated stable machine or tool may still contain certain differences that are visually imperceptible to most human viewers, but which are evident on a bit-by-bit evaluation of the full resolution image data. However, when those two full resolution images are converted into lower resolution images, the differences may be averaged out such that the bit-by-bit evaluation considers the two lower resolution images to be exactly the same. In this way, the second reduced image data of the reduced resolution second photo is more likely to match the (original) reduced image data of the reduced resolution (original) photo. Accordingly, applying the hash function to the second reduced image data is more likely to result in a hash value that is identical to the hash value calculated for the (original) reduced image data. By contrast, if the full resolution of the (original) photo and the full resolution of the second photo are used, the full resolution data of the second photo has a much higher probability of having at least one data difference compared to the full resolution data of the (original) photo. Yet, a single difference in data can result in highly different hash values to the hash function is unforgiving, and would typically calculate wildly different results. Thus, by reducing resolution of the (original) photo of the tattoo at the cloud application service, it is possible to calculate a hash value for the (original) photo and store that (original) hash value for later use when subsequent photos of tattoos are taken—each of which would be processed on the camera-enabled user device to reduce resolution (locally) before transmitting the reduced resolution photo over the network to the cloud application service for calculation of hash value and searching for matches.

Then the cloud application service can use the second unique tattoo image hash value to search for a matching hash value stored in the storage. Specifically, the cloud application service is configured to identify a match between the second reduced image data of the reduced resolution second photo and the reduced image data of the reduced resolution photo when the second unique tattoo image hash value matches the unique tattoo image hash value.

The client-side customized augmented reality audio playback and graphical overlay visual presentation non-soundwave tattoo method 2600 of some embodiments proceeds, after the cloud application service completes its image processing and searching, to a step for receiving (at 2680) the augmented reality overlay animation to playback on a screen of the camera-enabled user device, followed by aligning (at 2690) the position and orientation of the augmented reality overlay on the screen of the camera-enabled user device with respect to a live image of the tattoo shown on the screen. Finally, the client-side customized augmented reality audio playback and graphical overlay visual presentation non-soundwave tattoo method 2600 starts playback of the aligned augmented reality overlay on the screen (at 2695) while audibly outputting the audio portion of the multimedia file.

Now turning to a method performed by the cloud application service (or "server-side"), reference is made to FIG. 27, which conceptually illustrates the server-side customized augmented reality audio playback and graphical overlay visual presentation non-soundwave tattoo method 2700. As shown in this figure, the server-side customized augmented reality audio playback and graphical overlay visual presentation non-soundwave tattoo method 2700 starts by receiving (at 2710) a multimedia file with an audio portion and an image of a tattoo from a user device operated by a user. In this example, the tattoo is likely a shape, a symbol, or a script, but is not a wave form or soundwave design. Also, the image is received at a what is considered a full resolution for the camera which captured it.

Next, the server-side customized augmented reality audio playback and graphical overlay visual presentation non-soundwave tattoo method 2700 automatically performs the resolution down-sampling method against the full resolution image of the tattoo (at 2715). Carrying out the down-sampling method results in a reduced resolution tattoo image with reduced tattoo image data at a lower resolution than the full resolution image data of the received image of the tattoo.

In some embodiments, the server-side customized augmented reality audio playback and graphical overlay visual presentation non-soundwave tattoo method 2700 then calculates (at 2720) a unique tattoo image hash value by applying the hash function to the reduced tattoo image data of the reduced resolution tattoo image. In some embodiments, the server-side customized augmented reality audio playback and graphical overlay visual presentation non-soundwave tattoo method 2700 also creates (at 2725) an augmented reality overlay animation based on the received image of the tattoo at the full resolution. In particular, the augmented reality overlay animation is created to be time-synchronized for playback over a duration of time associated with the audio portion of the multimedia file. The duration of time may span a full time duration of the audio portion of the multimedia file or a reduced time duration of the audio portion of the multimedia file. In some cases, the full time duration includes start and end points that are automatically set by the cloud application service. Similarly, the reduced time duration may include start and end points that are manually set by the user or automatically by some other mechanism.

With the hash value calculated and the augmented reality overlay animation created, the server-side customized augmented reality audio playback and graphical overlay visual presentation non-soundwave tattoo method 2700 proceeds to a step for associating the augmented reality overlay animation with the unique tattoo image hash value (at 2730). Then the server-side customized augmented reality audio playback and graphical overlay visual presentation non-soundwave tattoo method 2700 carries out a step for storing (at 2735) the multimedia file with the audio portion, the image of the tattoo at the full resolution, the reduced image data of the reduced resolution image, the unique tattoo image hash value, and the augmented reality overlay animation associated with the unique tattoo image hash value in a storage. Now the server-side customized augmented reality audio playback and graphical overlay visual presentation non-soundwave tattoo method 2700 has completed a first part in which the overlay is created for a tattoo shape, symbol, or script (non-soundwave or non-waveform designed tattoo). The next steps of the server-side customized augmented reality audio playback and graphical overlay visual presentation non-soundwave tattoo method 2700 occur after a user tries to activate the augmented reality experience, which may be immediately after, or some time later.

Thus, when the user initiates activation of the augmented reality experience, the server-side customized augmented reality audio playback and graphical overlay visual presentation non-soundwave tattoo method 2700 approves the activation (at 2740) of the augmented reality experience for the soundwave script or soundwave symbol tattoo. The steps that occur after activation may depend on time, as noted above, driven by a user interaction to engage the augmented reality experience. For instance, by testing the activated augmented reality experience immediately after activation, or by demonstrating the effect of the augmented reality overlay animation and audio output in view of the non-waveform tattoo.

Thus, when the user engages to test or demonstrate, the server-side customized augmented reality audio playback and graphical overlay visual presentation non-soundwave tattoo method 2700 is involved by receiving (at 2745) a reduced resolution second image of a tattoo with second reduced image data and a request for an augmented reality overlay animation by a user device. In some embodiments, the request for the augmented reality overlay animation is an embedded data item that is sent from the user device to the cloud application service based on the function (to view animation instead of generating a new augmented reality experience) initiated in the software application by the user. Also, the software application running on the user device automatically converts a full resolution version of the second image (as captured) to the reduced resolution second image of the tattoo for faster transmission over the network to the cloud application service.

After the reduced resolution second image of the tattoo with the second reduced image data is received, the server-side customized augmented reality audio playback and graphical overlay visual presentation non-soundwave tattoo method 2700 of some embodiments calculates (at 2750) a second unique tattoo image hash value by applying the hash function to the second reduced image data of the reduced resolution second image of the tattoo. Then the server-side customized augmented reality audio playback and graphical overlay visual presentation non-soundwave tattoo method 2700 searches the storage for a hash value that matches the second unique tattoo image hash value (at 2755). Again, searching the storage for a hash value that matches the second unique tattoo image hash value involves identifying a match between the second reduced image data of the reduced resolution second image of the tattoo and the reduced image data of the reduced resolution image of the tattoo when the search for a matching hash value determines that the second unique tattoo image hash value matches the unique tattoo image hash value.

When a match is discovered between the second unique tattoo image hash value and the (original) unique tattoo image hash value, the server-side customized augmented reality audio playback and graphical overlay visual presentation non-soundwave tattoo method 2700 transmits (at 2760) the augmented reality overlay animation associated with the unique tattoo image hash value to the user device for playback in view of the tattoo shape, symbol, or script (non-waveform, non-soundwave). Note that in order to transmit the augmented reality overlay animation to the user device, the cloud application service needs first retrieve the augmented reality overlay animation associated with the unique tattoo image hash value from the storage. After the user device receives the transmission, the user may interact with the software application to playback the augmented reality overlay animation associated with the unique tattoo image hash value as a timed overlay coincident with playback of the audio portion of the multimedia file and aligned with the tattoo as presented in a camera field of view on the screen of the user device.

By way of example, FIG. 28 conceptually illustrates an augmented reality experience for a soundwave script 2800. In some embodiments, a user can turn a word or signature into a soundwave script tattoo can is configured for playback as an augmented reality overlay animation. The origin tattoo can be a tattoo applied to skin of a person or a temporary tattoo applied anywhere or even a sticker or other object that can be applied anywhere. As shown in this example, the word "Love" is written in a cursive script while an augmented reality overlay animation 2810 is being played back in connection with audible output associated with the word "Love".

By way of example, FIG. 29 conceptually illustrates an augmented reality experience for a soundwave symbol 2900. In some embodiments, a user can turn simple symbol or shape into a soundwave symbol tattoo that is configured for playback of an augmented reality overlay animation inside the symbol or shape. The original symbol or shape may be a tattoo that is applied to skin of a person or a temporary tattoo applied anywhere or even a sticker or other object that can be applied anywhere. As shown in this example, a shape of a heart is shown with an augmented reality overlay animation 2910 being played back in connection with audible output associated with the heart shape.

In some embodiments, any non-tattoo wave form design of a sound wave or sound wave object in any medium may be associated with a playback audio clip. any two-dimensional or three-dimensional soundwave design that is not applied as a tattoo is possible. For example, a three-dimensional wooden wave form structure of the sound wave can be deployed and the system can capture/scan the wave form structure of the object in the real-world to overlay augmented reality and playback an audio clip.

In some embodiments, the customized augmented reality audio playback and graphical overlay visual presentation method is for audibly outputting sound associated with a wave form object that is not a tattoo but which corresponds to a sound wave and visually outputting a customized overlay associated with the wave form object.

For two-dimensional sound wave designs that are not applied as tattoos, FIG. 30 provides a flow chart of a method and FIG. 32 demonstrates an example of a non-tattoo two-dimensional sound wave object.

For three-dimensional sound wave designs that are not applied as tattoos, FIG. 31 provides a flow chart of a method and FIG. 33 demonstrates an example of a non-tattoo two-dimensional sound wave object.

In some embodiments, any non-tattoo wave form design of a sound wave or sound wave object in any medium may be associated with a playback audio clip and augmented reality overlay for playback of the audio clip when any non-tattoo two-dimensional or three-dimensional soundwave design or object is captured or scanned. An example of a two-dimensional non-tattoo soundwave design method is described below, by reference to FIG. 30 while an example of a three-dimensional non-tattoo soundwave design method is described below, by reference to FIG. 31. Also, an example of a two-dimensional non-tattoo soundwave design object is described by reference to FIG. 32 and an example of a three-dimensional non-tattoo soundwave design object is described by reference to FIG. 33.

By way of example, FIG. 30 conceptually illustrates a two-dimensional ("2D") non-tattoo soundwave design method 3000 for creating and playing a customized augmented reality and graphical overlay audio-visual presentation for a 2D non-tattoo soundwave object. In some embodiments, the 2D non-tattoo soundwave design method 3000 starts by capturing (at 3010) an image of a 2D non-tattoo soundwave design. The 2D non-tattoo soundwave design may be applied as a two-dimensional object such as, without limitation, a painting of a soundwave, a public mural soundwave painting, a sticker with a two-dimensional soundwave design, etc. The image of the 2D non-tattoo soundwave design may be captured by a user operating a camera-enabled user device. The camera-enabled user device may a mobile device, such as a smartphone, on which the software application may be installed and launched as an interactive application. On the other hand, the image may be captured by a camera that is separate from the user device on which the software application is installed. For example, a dedicated photographic camera (e.g., a digital SLR camera), a dedicated video camera (e.g., a 4K resolution video camera), a webcam connected to a conventional desktop PC, etc.

In some embodiments, the 2D non-tattoo soundwave design method 3000 then proceeds to a step for receiving (at 3020) a selection of a multimedia file with an audio portion to associate with the 2D non-tattoo soundwave design and to playback when in view of the 2D non-tattoo soundwave object. Then the 2D non-tattoo soundwave design method 3000 of some embodiments proceeds to a step for uploading (at 3030) the captured image and multimedia file with audio to a cloud application service configured to generate an augmented reality overlay animation based on at least the image and audio. Specifically, the image is uploaded at its full resolution, meaning that full resolution image data is provided to the cloud application service. Having a full resolution (or high quality) image improves the ability of the cloud application service in creating the augmented reality overlay animation. However, for its own part, the cloud application service creates a lower resolution version of the image to use in later comparisons when a user wants to test or view the augmented reality overlay animation and sound whenever the user is in view of the 2D non-tattoo soundwave design.

After uploading the full resolution image and the multimedia file with the audio portion, the 2D non-tattoo soundwave design method 3000 transitions to a step for activating (at 3040) an augmented reality experience for a non-tattoo 2D soundwave object. This activation is based on a user initiating the activation in connection with the uploaded image and audio of the multimedia file. In some cases, the user purchases an activation to proceed. In other cases, an activation can proceed after the user provides a set of requested biographical information. Whatever the requirements may be, the activation is not completed until an authorized user (which may be an automated process or program that is managed by the cloud application service) approves the activation.

After activation is approved, the user may interact with the software application to playback the augmented reality overlay animation and audio whenever in view of the non-tattoo 2D soundwave design. To do so, the user takes another picture of the non-tattoo 2D soundwave design. Note this second (or subsequent) picture of the non-tattoo 2D soundwave design may be a replica of the original non-tattoo 2D soundwave design that is publicly accessible from a different location. For example, a poster with a non-tattoo 2D soundwave design may be mass produced and may be found at multiple, different locations. The mass production of the non-tattoo 2D soundwave design means that the non-tattoo 2D soundwave design features in each poster is a replica of an original design (which is not necessarily the source of the original image the user captures in having the augmented reality overlay animation created in the first place). Thus, when the user is ready to capture another picture of the non-tattoo 2D soundwave design (either original or replica), the 2D non-tattoo soundwave design method 3000 carries out a step—at user's direction (through the software application)—for capturing a subsequent image of a publicly accessible deployment of the non-tattoo 2D soundwave object (at 3050).

As before, the image is captured at a full resolution of the camera. However, in this case, a lower resolution version of the image is preferred. Accordingly, the software application automatically reduces resolution of the full resolution image as captured, which yields low resolution image data. This provides a performance improvement since the data transmission requirements are vastly reduced, thereby speeding up turn-around time and overall network performance. What is achieved in turn-around time is typically considered approximately in realtime. Thus, after the full resolution version of the captured image is reduced to a lower resolution image, the 2D non-tattoo soundwave design method 3000 moves forward to the step for uploading (at 3060) the reduced resolution image data for the lower resolution image version of the full resolution subsequent image. The lower resolution image (also referred to as the reduced image) can then be processed by the cloud application service to calculate a hash value to compare to the original hash value calculated against a lower resolution version of the originally captured image of the 2D non-tattoo soundwave design.

In some embodiments, the 2D non-tattoo soundwave design method 3000 then performs the step of receiving (at 3070) an augmented reality overlay animation with the audio portion from the cloud application service. By receiving the augmented reality overlay animation, the user may prepare to enjoy the audio/visual augmented reality experience of playback while in view of the non-tattoo 2D soundwave design. Furthermore, the audio is time synchronized to the soundwave form.

After receiving the augmented reality overlay animation from the cloud application service, the 2D non-tattoo soundwave design method 3000 moves ahead to a step for aligning a position and orientation of the augmented reality overlay animation (at 3080) with respect to the non-tattoo 2D soundwave design. In some embodiments, the 2D non-tattoo soundwave design method 3000 then performs the final step of playing the audio and the aligned augmented reality overlay animation (at 3090), thereby providing the user the augmented reality experience at any publicly accessible deployment location of the non-tattoo 2D soundwave design. Then the 2D non-tattoo soundwave design method 3000 ends.

By way of another non-tattoo soundwave design example, FIG. 31 conceptually illustrates a three-dimensional ("3D") non-tattoo soundwave design method 3100 for creating and playing a customized augmented reality and graphical overlay audio-visual presentation for a 3D non-tattoo soundwave object. When processing images of objects in three dimensions, there are issues of perspective that may arise. In some embodiments, the software application prompts the user to indicate when an image of a non-tattoo soundwave object is a 3D object. In some other embodiments, the software application automatically detects target objects in images as either 2D or 3D, and proceeds accordingly. By understanding that an augmented reality experience (to be created) is going to be based on a particular non-tattoo soundwave design that is three-dimensional, the 3D non-tattoo soundwave design method 3100 can carry out a variety of steps that are different from the steps of the 2D non-tattoo soundwave design method 3000, described above by reference to FIG. 30.

The 3D non-tattoo soundwave design method 3100 for creating and playing a customized augmented reality and graphical overlay audio-visual presentation for a 3D non-tattoo soundwave object starts at a first step for capturing (at 3105) an image of a non-tattoo 3D soundwave design. As noted above, the software application may prompt the user to indicate whether the image contains a three-dimensional target object or not. Alternately, the software application may process the captured image to automatically determine if a three-dimensional object is present. After determining that the image include a 3D soundwave object or design, the 3D non-tattoo soundwave design method 3100 carries out a step for receiving a selection of a multimedia file with an audio portion (at 3110) to associate with the non-tattoo 3D soundwave design. In some embodiments, the step for capturing the image (at 3105) may be actually involve selection of a pre-existing image of a non-tattoo 3D soundwave design (hereinafter referred to as the "captured image" even for an image that is selected). Whether captured by a camera-enabled user device, a conventional digital camera, or selected from a storage location with pre-existing images, the image of the non-tattoo 3D soundwave design is a full resolution image, meaning that the image is received at the resolution in which it was originally captured. Also, in some embodiments, the steps for capturing (at 3105) the image and selecting the multimedia file with the audio portion (at 3110) may be performed in different order, with selection of the multimedia file occurring before the image of the non-tattoo 3D soundwave design is captured or selected.

In some embodiments, the 3D non-tattoo soundwave design method 3100 proceeds to a step for generating a digital 3D model (at 3115) based on a perspective view of the non-tattoo 3D soundwave design in the captured image. A perspective view is needed by the software application in order to determine a relative depth dimension for building the digital 3D model. Thus, the 3D non-tattoo soundwave design method 3100 generates (at 3115) the digital 3D model when the software application detects a depth dimension in the image. An example of a non-tattoo 3D soundwave object with a detectable depth dimension is described below, by reference to FIG. 33. In some embodiments, the 3D non-tattoo soundwave design method 3100 then carries out a step for uploading (at 3120) the digital 3D model, the captured image with full resolution image data, and the selected multimedia file with the audio portion to a cloud application service. Next, the 3D non-tattoo soundwave design method 3100 performs a step for activating (at 3125) an augmented reality experience for the non-tattoo 3D soundwave object. Activation is based on the user initiating activation via the software application, and an authorized user approving the activation, as described above.

After activation, the 3D non-tattoo soundwave design method 3100 proceeds to a step for capturing (at 3130) a subsequent image of a soundwave object resembling the non-tattoo 3D soundwave design. The soundwave object is said to 'resemble' the non-tattoo 3D soundwave design because it may not actually be presented in a sufficient perspective view. Also, the subsequent image is either a standalone image or an image in a video sequence of frames, and is based on the user wanting to test or view the augmented reality experience in view of the non-tattoo 3D soundwave design. However, in this case, the subsequent image needs to have a perspective viewing angle so that the depth dimension can be derived from the non-tattoo 3D soundwave design. Accordingly, the 3D non-tattoo soundwave design method 3100 determines (at 3135) whether the subsequent image includes a perspective view demonstrating three dimensions of the non-tattoo 3D soundwave design. When no perspective view is included (e.g., the subsequent image was captured straight in front of the non-tattoo 3D soundwave design), then the 3D non-tattoo soundwave design method 3100 provides a notification to the user to recapture the subsequent image at a different perspective (at 3140) or quit this operation as a 3D object when, in fact, the target is not a 3D object. The 3D non-tattoo soundwave design method 3100 returns to the step for capturing the subsequent image of the soundwave object resembling the non-tattoo 3D soundwave design (at 3130) and proceeds accordingly.

Thus, when a perspective view is detected for the soundwave object resembling the non-tattoo 3D soundwave design in the subsequent image, then the 3D non-tattoo soundwave design method 3100 moves forward to a step for generating a digital 3D model (at 3145) based on the perspective view in the subsequent image of the soundwave object resembling the non-tattoo 3D soundwave design. Then a resolution reduction happens so that the 3D non-tattoo soundwave design method 3100 uploads both the digital 3D model and a reduced resolution version of the subsequent image (at 3150) to the cloud application service for processing. After the cloud application service processes the uploaded data, it transmits the augmented reality overlay animation back. Thus, the 3D non-tattoo soundwave design method 3100 receives (at 3155) the augmented reality overlay animation and audio to playback in view of the non-tattoo 3D soundwave design from the cloud application service. In this case, the playback is in view of the non-tattoo 3D soundwave design (not the soundwave object resembling the non-tattoo 3D soundwave design) because the cloud application service only returns the augmented reality overlay animation when (i) the digital 3D model of the resembling soundwave design and the digital 3D model of the original soundwave designed have been normalized to a common size and oriented to a same perspective in three-dimensional space and (ii) the resembling soundwave design and the original soundwave design are determined to be the same non-tattoo 3D soundwave design object.

Finally, the 3D non-tattoo soundwave design method 3100 proceeds to the step for playing the augmented reality overlay animation and corresponding audio in view the non-tattoo 3D soundwave design. Then the 3D non-tattoo soundwave design method 3100 ends.

By way of demonstration, FIG. 32 shows an example of a 2D non-tattoo soundwave design 3200 and a customized augmented reality graphical overlay 3210. The 2D non-tattoo soundwave design 3200 could be a painting or mural on a wall and may only be an outline of the soundwave shape depicted. The customized augmented reality graphical overlay 3210 in this case appears like a pair of eyes peering out back at viewers. In combination with the audio that is audibly output, the customized augmented reality graphical overlay 3210 may both appear and animate during playback of sound. For example, the eyes may be made to blink as the sounds at those moments of the audio are output.

In another non-tattoo example, FIG. 33 demonstrates a 3D non-tattoo soundwave design 3300. In the 3D non-tattoo soundwave design 3300, there is also present a detectable measure of depth 3310 which, when detected, triggers the software application to render a digital 3D model. It should be noted also that the digital 3D model can be as simple as a wireframe model or as advanced as a 3D model of a computer graphics imagery (CGI) modeling program, or any other type of model or data representation that is capable of indicating depth in relation to height and length dimensions.

In addition to non-tattoo soundwave designs and non-tattoo wave form shapes, symbols, objects (either/both in 2D and 3D), it is also possible for any non-tattoo two or three dimensional image, object, or shape to be captured or scanned, and then to be associated with a playback audio clip. Examples of two or three dimensional images, objects, or shapes include, without limitation, a basketball jersey where the numbers on the jersey are the target and have an overlay during playback (neither a tattoo nor a soundwave form), a three dimensional structure or sculpture (neither a tattoo nor a soundwave form), a business card in which sound is played back upon capturing or scanning an image of the business card with the software application (neither a tattoo nor a soundwave form).

In some embodiments, the customized augmented reality audio playback and graphical overlay visual presentation method is for audibly outputting sound associated with any two dimensional or three dimensional image, object, or shape that is not a tattoo and not shaped or formed like a soundwave or wave form, but which corresponds to an audible portion (e.g., a sound file) that is output along with visually outputting a customized overlay associated with the two or three dimensional image, object, or shape. Thus, it is possible to use any two or three dimensional image, object, or shape to associate with a sound file so that when it is scanned using the software application on a user device, the image, object, or shape will be identified and the software application with playback the corresponding sound using an overlay over that image, object, or shape as presented on the screen of the user device.

By way of example, FIG. 34 conceptually illustrates a network architecture of a customized augmented reality audio playback and graphical overlay visual presentation system 3400 that hosts a cloud application service configured to provide augmented reality experiences to users. Specifically, the cloud application service hosted by the customized augmented reality audio playback and graphical overlay visual presentation system 3400 is configured to generate and store an image of an object, compare a real-world object to the stored image of the object, and, upon matching the real-world object to the stored image of the object, create a customized augmented reality experience that outputs audio associated with the stored image of the object and displays a visual graphical overlay aligned to a view of the real-world object. As shown in this figure, the customized augmented reality audio playback and graphical overlay visual presentation system 3400 includes a plurality of camera-enable user devices 3410-3416. Specifically, the plurality of camera-enable user devices 3410-3416 comprise a mobile device 3410 with an onboard camera, a desktop computer 3412 with a web camera, a tablet computing device 3414 with an onboard camera, and a laptop computer 3416 with an onboard camera and an option to connect an external web camera. The customized augmented reality audio playback and graphical overlay visual presentation system 3400 also includes a wireless communication point 3420 (e.g., a cell tower for cellular data communication), a gateway 3430, a customized augmented reality audio playback and graphical overlay cloud application service 3440 hosted on a web server, an image resolution down-sampling and hash value creation and matching engine 3450, a reduced image and hash value storage 3460, an augmented reality overlay animation creation engine 3470 with a 3D depth detection processor and a digital 3D model creation engine, an augmented reality overlay animation storage 3480, a user based augmented reality experience activations database 3490, and a full resolution tattoo image database 3495 which stores full resolution images of tattoos and other targets (shapes, symbols, waveforms, non-waveforms, etc.) when uploaded by users and used in the creation of each augmented reality overlay animation. The software application described above runs on each device in the plurality of camera-enable user devices 3410-3416 and, when connected to the customized augmented reality audio playback and graphical overlay cloud application service 3440, allows users to capture a tattoo or target object or design and select a multimedia file with at least one audio portion to create an augmented reality experience in view of the tattoo or target object or design.

As noted above, there is no simple way to identify a tattoo in a photo and match the photographic tattoo to an image mask of the tattoo because of the wide variations that exist between skin types, colors, hair, and the variations in lighting conditions which the photos or video are taken. In some embodiments, the customized augmented reality audio playback and graphical overlay visual presentation system comprises a tattoo image database storing a multitude of tattoo images as well as the corresponding image mask overlays of the tattoos in the tattoo images (also referred to as a "library of tattoo photos and image mask overlays"). In FIG. 34, the full resolution tattoo image database 3495 is the tattoo image database with the ability to go beyond mere storage of tattoo images, and store all images used in connection with an augmented reality overlay animation. In some embodiments, the customized augmented reality audio playback and graphical overlay visual presentation system uses the library of tattoo photos and image mask overlays stored in the tattoo image database to train machine learning models to identify tattoos in photos. In some embodiments, the customized augmented reality audio playback and graphical overlay visual presentation system is configured to use the library of tattoo photos and image mask overlays as a training set to train a machine learning algorithm to recognize tattoos in photos or video and automatically generate real-time overlay masks corresponding to the tattoos.

In some embodiments, machine learning units run as part of the customized augmented reality audio playback and graphical overlay cloud application service 3440. In some embodiments, the full resolution tattoo image database 3495 stores the raw, full resolution images provided by users. As such, the machine learning units utilize the full resolution images in the full resolution tattoo image database 3495 as training data. In this way, the customized augmented reality audio playback and graphical overlay cloud application service 3440 continually improves accuracy with respect to different skin tones, blemishes which may or may not be present on any given user's skin, and/or otherwise improves detection of depth for 3D waveform shapes that are not tattoos, and so forth.

In addition to the several features and functions described above, there are other features and functions that are supported by the customized augmented reality audio playback and graphical overlay visual presentation system 3400. Specifically, the customized augmented reality audio playback and graphical overlay visual presentation system 3400 of some embodiments comprises an augmented reality target database (such as the augmented reality overlay animation storage 3480) that is configured to enable augmented reality overlay experience playback when a viewing user is located nearby a target source (hereinafter referred to as the "augmented reality target"). In some embodiments, the customized augmented reality audio playback and graphical overlay visual presentation system 3400 stores each augmented reality target in the augmented reality target database (or the augmented reality overlay animation storage 3480) and associates the augmented reality target with an account of a registered user (retrieved from the user augmented reality experience activations database 3490) so that the augmented reality experience can only be identified and played back by the user that created it (the "creator user"). In some embodiments, the creator user can enable location services within their user device and then turn on a setting in the software application to allow for sharing of augmented reality targets with other users who are present within a nearby area of the creator user as defined by a specified radius. The other nearby users within this radius can then add the augmented reality experience of the creator user to a local database on their respective devices and associated with the software application in order to identify the augmented reality target of the user creator for playback.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" and "software application" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 35 conceptually illustrates an electronic system 3500 with which some embodiments of the invention are implemented. The electronic system 3500 may be a computer (desktop, laptop, single board computer, etc.), a phone (cell phone, mobile phone, smartphone, etc.), tablet computing device, a personal digital assistant (PDA), or any other computing device, electronic device, etc. Such an electronic system includes various types of computer readable media and interfaces for various other types of computer readable media. Electronic system 3500 includes a bus 3505, processing unit(s) 3510, a system memory 3515, a read-only memory 3520, a permanent storage device 3525, input devices 3530, output devices 3535, and a network 3540.

The bus 3505 collectively represents all system, peripheral, and chipset buses that communicatively connect the numerous internal devices of the electronic system 3500. For instance, the bus 3505 communicatively connects the processing unit(s) 3510 with the read-only memory 3520, the system memory 3515, and the permanent storage device 3525.

From these various memory units, the processing unit(s) 3510 retrieves instructions to execute and data to process in order to execute the processes of the invention. The processing unit(s) may be a single processor or a multi-core processor in different embodiments.

The read-only-memory (ROM) 3520 stores static data and instructions that are needed by the processing unit(s) 3510 and other modules of the electronic system. The permanent storage device 3525, on the other hand, is a read-and-write memory device. This device is a non-volatile memory unit that stores instructions and data even when the electronic system 3500 is off. Some embodiments of the invention use a mass-storage device (such as a magnetic or optical disk and its corresponding disk drive) as the permanent storage device 3525.

Other embodiments use a removable storage device (such as a floppy disk or a flash drive) as the permanent storage device 3525. Like the permanent storage device 3525, the system memory 3515 is a read-and-write memory device. However, unlike storage device 3525, the system memory 3515 is a volatile read-and-write memory, such as a random access memory. The system memory 3515 stores some of the instructions and data that the processor needs at runtime. In some embodiments, the invention's processes are stored in the system memory 3515, the permanent storage device 3525, and/or the read-only memory 3520. For example, the various memory units include instructions for processing appearance alterations of displayable characters in accordance with some embodiments. From these various memory units, the processing unit(s) 3510 retrieves instructions to execute and data to process in order to execute the processes of some embodiments.

The bus 3505 also connects to the input and output devices 3530 and 3535. The input devices enable the user to communicate information and select commands to the electronic system. The input devices 3530 include alphanumeric keyboards and pointing devices (also called "cursor control devices"). The output devices 3535 display images generated by the electronic system 3500. The output devices 3535 include printers and display devices, such as liquid crystal displays (LCD) and organic light emitting diode (OLED) displays. Some embodiments include devices such as a touchscreen that functions as both input and output devices.

Finally, as shown in FIG. 35, bus 3505 also couples electronic system 3500 to a network 3540 through a network adapter (not shown). In this manner, the computer can be a part of a network of computers (such as a local area network ("LAN"), a wide area network ("WAN"), or an intranet), or a network of networks (such as the Internet). Any or all components of electronic system 3500 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, machine-readable storage media, or non-transitory computer readable medium). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 9-10, 26-27, and 30-31 conceptually illustrate processes in which the specific operations of the process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

We claim:

1. A two-dimensional ("2D") non-tattoo soundwave design method for creating and playing a customized augmented reality and graphical overlay audio-visual presentation in view of a 2D non-tattoo soundwave object:

capturing an image of a non-tattoo 2D soundwave design;

receiving a selection of a multimedia file with an audio portion to associate with the 2D soundwave design;

uploading the captured image with full resolution image data and the selected multimedia file with the audio portion to a cloud application service;

capturing a subsequent image of a deployment of the non-tattoo 2D soundwave design to an object;

uploading reduced resolution image data of a reduced image resulting from a reduction in resolution of the subsequent image to a cloud application service configured to create an augmented reality overlay animation with the audio portion for playback in view of the non-tattoo 2D soundwave design deployed to the object;

receiving, from the cloud application service, the augmented reality overlay animation with the audio portion for playback in view of the non-tattoo 2D soundwave design deployed to the object; and playing the augmented reality overlay animation and the audio portion in view of the non-tattoo 2D soundwave design deployed to the object.

2. The 2D non-tattoo soundwave design method of claim 1 further comprising activating an augmented reality experience for the non-tattoo 2D soundwave object.

3. The 2D non-tattoo soundwave design method of claim 2, wherein activating the augmented reality experience for the non-tattoo 2D soundwave object is a requirement for receiving, from the cloud application service, the augmented reality overlay animation with the audio portion for playback in view of the non-tattoo 2D soundwave design.

4. The 2D non-tattoo soundwave design method of claim 1, wherein the deployment of the non-tattoo 2D soundwave object is a publicly accessible deployment of the non-tattoo 2D soundwave object.

5. The 2D non-tattoo soundwave design method of claim 1 further comprising aligning a position and an orientation of the augmented reality overlay animation with respect to the non-tattoo 2D soundwave design deployed to the non-tattoo 2D soundwave object.

6. A client-side customized augmented reality audio playback and graphical overlay visual presentation non-soundwave tattoo method comprising:

capturing a photo of a tattoo by a camera-enabled user device operated by a user;

receiving, by user interaction with a software application running on the camera-enabled user device, a user selection of a multimedia file with an audio portion;

uploading, through the software application running on the camera-enabled user device, full resolution image data for the photo of the tattoo and the multimedia file with the audio portion to a cloud application service that is configured to create an augmented reality overlay animation;

capturing a second photo of the tattoo by the camera-enabled user device while running the software application;

generating a reduced resolution second photo of the tattoo with reduced second image data;

uploading, by the software application running on the camera-enabled user device, the second reduced image data of the reduced resolution second photo of the tattoo;

receiving, by the software application running on the camera-enabled user device, a particular augmented reality overlay animation from the cloud application service to playback on a screen of the camera-enabled user device, wherein the tattoo is shown on the screen; and playing, in the software application running on the camera-enabled user device, the particular augmented reality overlay animation in view of the tattoo on the screen while audibly outputting the audio portion of the multimedia file.

7. The client-side customized augmented reality audio playback and graphical overlay visual presentation non-soundwave tattoo method of claim 6, wherein the tattoo has a tattoo form that is not a waveform and not a soundwave shape.

8. The client-side customized augmented reality audio playback and graphical overlay visual presentation non-soundwave tattoo method of claim 7, wherein the tattoo form comprises one of a script and a symbol.

9. The client-side customized augmented reality audio playback and graphical overlay visual presentation non-soundwave tattoo method of claim 8 further comprising activating an augmented reality experience for one of a soundwave script tattoo and a soundwave symbol tattoo corresponding to the tattoo form.

10. The client-side customized augmented reality audio playback and graphical overlay visual presentation non-soundwave tattoo method of claim 6, wherein generating the reduced resolution second photo of the tattoo with the reduced second image data comprises performing a resolution down-sampling method to reduce resolution of the second photo of the tattoo to a lower resolution than the full resolution of the second photo of the tattoo.

11. The client-side customized augmented reality audio playback and graphical overlay visual presentation non-soundwave tattoo method of claim 6 further comprising aligning a position and an orientation of the particular augmented reality overlay on the screen of the camera-enabled user device to a live image of the tattoo shown on the screen.

* * * * *